United States Patent [19]
Allen et al.

[11] Patent Number: 5,787,928
[45] Date of Patent: Aug. 4, 1998

[54] VALVE STRUCTURE

[75] Inventors: Harold T. Allen, Indianapolis, Ind.; Edward T. Feldman, Buffalo Grove, Ill.; Varce E. Howe, Zionsville, Ind.; Ghaffar Kazkaz, Mount Prospect, Ill.; Jerry L. McPherson, Jr., Greenfield; James A. Scharfenberger, Indianapolis, both of Ind.

[73] Assignee: Ransburg Corporation, Indianapolis, Ind.

[21] Appl. No.: 429,020

[22] Filed: May 3, 1995

Related U.S. Application Data

[63] Continuation-in-part of Ser. No. 273,653, Jul. 12, 1994, abandoned.

[51] Int. Cl.⁶ .................................................. F16K 11/076
[52] U.S. Cl. ................ 137/625.43; 137/240; 137/625.47
[58] Field of Search ......................... 137/625.43, 625.47, 137/240

[56] References Cited

U.S. PATENT DOCUMENTS

| | | |
|---|---|---|
| 1,655,262 | 1/1928 | Fortin . |
| 2,547,440 | 4/1951 | Clark et al. . |
| 2,673,232 | 3/1954 | Silsby, Jr. . |
| 2,814,551 | 11/1957 | Broeze et al. . |
| 2,921,604 | 1/1960 | Zettl ............................... 137/625.43 |
| 3,098,890 | 7/1963 | Peterson . |
| 3,122,320 | 2/1964 | Beck et al. . |
| 3,291,889 | 12/1966 | Uline et al. . |
| 3,419,827 | 12/1968 | Webb ............................ 137/625.43 X |
| 3,450,092 | 6/1969 | Kock . |
| 3,838,946 | 10/1974 | Schall . |
| 3,893,620 | 7/1975 | Rokadia . |
| 3,933,285 | 1/1976 | Wiggins . |
| 3,934,055 | 1/1976 | Tammy . |
| 4,017,029 | 4/1977 | Walberg . |
| 4,020,866 | 5/1977 | Wiggins . |
| 4,030,860 | 6/1977 | Standlick . |
| 4,085,892 | 4/1978 | Dalton . |
| 4,232,055 | 11/1980 | Shaffer . |
| 4,275,834 | 6/1981 | Spanjersberg et al. . |
| 4,304,252 | 12/1981 | Stanton ............................... 137/240 |
| 4,313,475 | 2/1982 | Wiggins . |
| 4,381,180 | 4/1983 | Sell . |
| 4,383,644 | 5/1983 | Spanjersberg et al. . |
| 4,386,888 | 6/1983 | Verley . |
| 4,413,788 | 11/1983 | Schaefer et al. . |
| 4,515,516 | 5/1985 | Perrine et al. . |
| 4,552,334 | 11/1985 | Tomiyama et al. ............. 137/625.47 X |
| 4,741,673 | 5/1988 | Jubb . |
| 4,792,092 | 12/1988 | Elberson et al. . |
| 4,878,622 | 11/1989 | Jamison et al. . |
| 4,879,137 | 11/1989 | Behr et al. . |
| 4,881,688 | 11/1989 | Hankvist et al. . |
| 4,884,745 | 12/1989 | Spongh . |
| 4,932,589 | 6/1990 | Diana . |
| 4,962,724 | 10/1990 | Prus et al. . |
| 4,982,903 | 1/1991 | Jamison et al. . |
| 5,033,942 | 7/1991 | Petersen . |
| 5,078,168 | 1/1992 | Konieczynski . |
| 5,094,389 | 3/1992 | Giroux et al. . |
| 5,096,126 | 3/1992 | Giroux et al. . |

(List continued on next page.)

FOREIGN PATENT DOCUMENTS

| | | |
|---|---|---|
| 1393333 | 5/1975 | United Kingdom . |
| 1478853 | 7/1977 | United Kingdom . |

*Primary Examiner*—John Fox
*Attorney, Agent, or Firm*—Barnes & Thornburg

[57] ABSTRACT

A valve has a housing and a component movable within the housing. The housing has first, second, third and fourth ports formed in it. The movable component has a first passageway formed in it. Movement of the movable component within the housing selectively connects the first port through the first passageway to the second port. The movable component is selectively movable to disconnect the first port and second port and to connect the second port through the first passageway to the third port. A second passageway is defined between the housing and the movable component. The fourth port is connected to the second passageway.

22 Claims, 27 Drawing Sheets

U.S. PATENT DOCUMENTS

| | | |
|---|---|---|
| 5,102,045 | 4/1992 | Diana . |
| 5,102,046 | 4/1992 | Diana . |
| 5,105,851 | 4/1992 | Fogelman ............... 137/625.47 X |
| 5,154,357 | 10/1992 | Jamison et al. . |
| 5,193,750 | 3/1993 | LaMontagne et al. . |
| 5,197,676 | 3/1993 | Konieczynski et al. . |
| 5,244,012 | 9/1993 | Tabata et al. . |
| 5,249,748 | 10/1993 | Lacchia et al. . |
| 5,255,856 | 10/1993 | Ishibashi et al. . |
| 5,273,072 | 12/1993 | Phillips . |
| 5,288,029 | 2/1994 | Ishibashi et al. . |
| 5,288,525 | 2/1994 | Diana . |
| 5,326,031 | 7/1994 | Konieczynski . |
| 5,340,289 | 8/1994 | Konieczynski . |
| 5,341,990 | 8/1994 | Konieczynski . |
| 5,364,035 | 11/1994 | Ma et al. . |

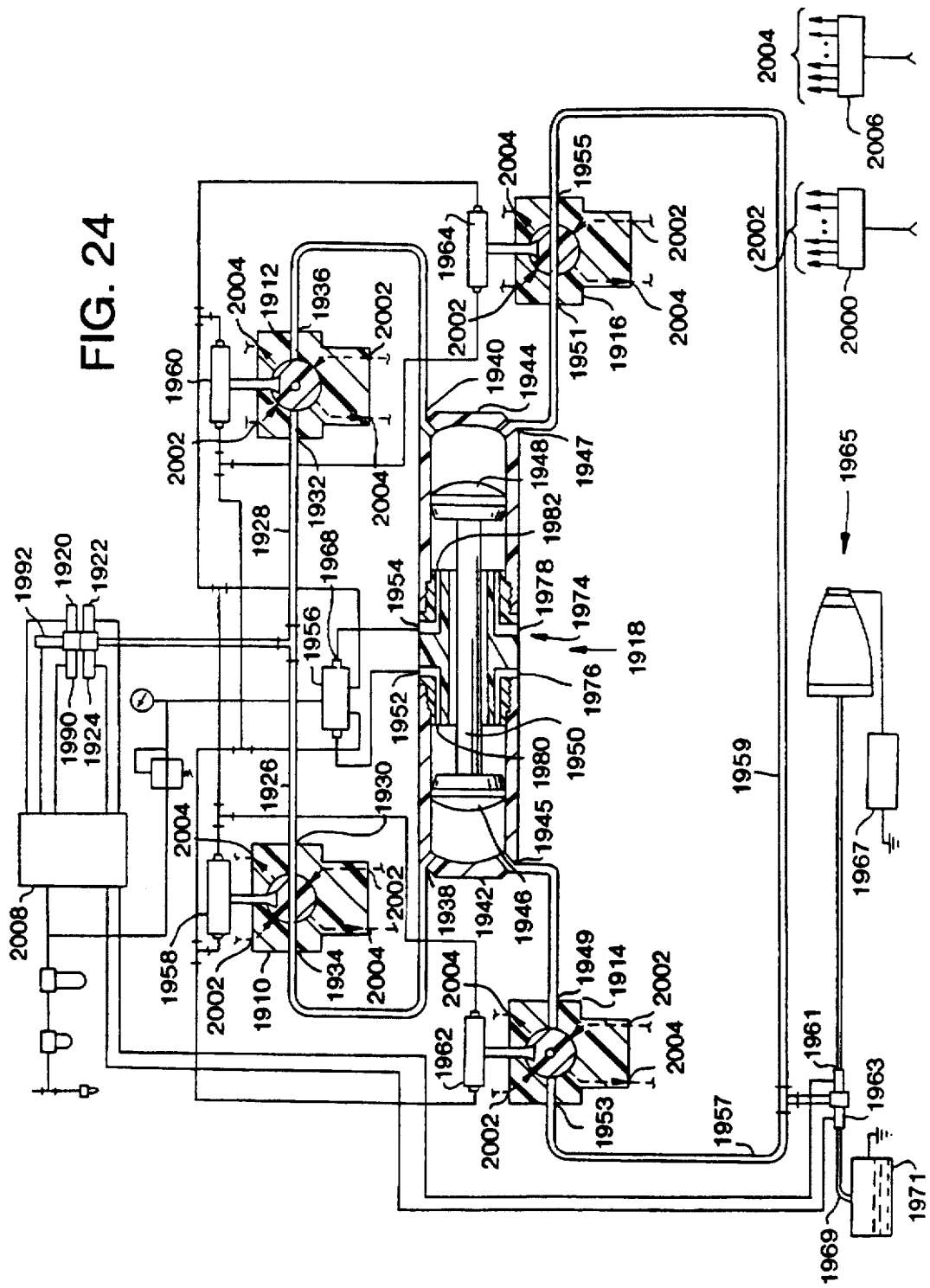

5,787,928

1

VALVE STRUCTURE

This application is a continuation in part of Ser. No. 08/273,653 filed Jul. 12, 1994 now abandoned.

BACKGROUND OF THE INVENTION

1. Field of the Invention

This invention relates to improvements in so called "voltage blocks", devices for the isolation of components of a system which are maintained at high magnitude positive or negative electrical potential from typically grounded system components even in the presence of continuous or intermittent flow of, for example, an electrically non-insulative fluid therebetween. Thus, throughout this application, the term voltage block is used to describe devices which function to minimize, to the extent they can, the flow of current. Such current would otherwise flow from first system components maintained at high magnitude electrical potential through a stream of electrically non-insulative fluid, such as waterbase coating material, flowing between the first components and second system components maintained at high magnitude electrical potential of opposite sign, or much lower magnitude electrical potential, for example, ground potential.

2. Description of the Prior Art

Many voltage blocks are illustrated and described in the prior art. There are, for example, the voltage blocks illustrated and described in U.S. Pat. Nos.: 4,878,622; 4,982,903; 5,033,942; 5,154,357; and 5,193,750, and the references cited in those patents, particularly including U.S. Pat. Nos.: 1,655,262; 2,547,440; 2,673,232; 3,098,890; 3,122,320; 3,291,889; 3,893,620; 3,933,285; 3,934,055; 4,017,029; 4,020,866; 4,085,892; 4,275,834; 4,313,475; 4,383,644; and, 4,413,788, and U.K. Patent Specifications 1,393,333 and 1,478,853. Also of interest are U.S. Pat. Nos.: 2,814,551; 3,838,946; 4,030,860; 4,232,055; 4,381,180; 4,386,888; 4,515,516; 4,741,673; 4,792,092; 4,879,137; 4,881,688; 4,884,745; 4,932,589; 4,962,724; 5,078,168; 5,096,126; 5,102,045; 5,102,046; 5,197,676; 5,249,748; and, 5,255,856. No representation is intended by this listing that this is a complete listing of all pertinent prior art, or that a thorough search of all pertinent prior art has been conducted, or that no better prior art exists. Nor should any such representation be inferred.

SUMMARY OF THE INVENTION

A voltage blocking system transfers electrically conductive coating materials, such as water-based paints, from a source at ground potential to a dispenser at high-magnitude potential. At the same time, the system limits to a small value the electric current between the dispenser and the source. This maintains the high-magnitude dispenser voltage, insuring efficient coating material charging and safe coating operation. There are two versions of the system, one semi-automatic and one automatic. The automatic version includes a first reservoir, a second reservoir, a high voltage-blocking valve and a control unit. The high voltage-blocking valve has a first port coupled to the coating material source, a second port coupled to the first reservoir, a third port coupled to the second reservoir and a fourth port coupled to the dispenser. The valve has a first position and a second position. In the first position, the valve couples the first port to the second port and the third port to the fourth port, permitting coating material to flow from the source to the first reservoir and from the second reservoir to the dispenser. In this position, the third and fourth ports are electrically isolated from the first and second ports. The control unit senses when the first reservoir is full and the second reservoir is empty and triggers an actuator to switch the high voltage-blocking valve to its second position. In the second position the high voltage blocking valve couples the first port to the third port and the second port to the fourth port, permitting coating material to flow from the source to the second reservoir and from the first reservoir to the dispenser. In this position, the second and fourth ports are electrically isolated from the first and third ports. The control unit senses when the second reservoir is full and the first reservoir is empty and triggers the actuator to switch the high voltage-blocking valve to its first position. The operation continues in this manner, insuring continuous flow of coating material from the source alternately to the reservoirs and alternately from the reservoirs to the dispenser. This flow will not be interrupted, even during the switching of the valve between its two positions. At all times, the dispenser is electrically isolated from the source and the two reservoirs are electrically isolated from each other, limiting the electric current between the dispenser and the source to a small value.

The semi-automatic version includes one reservoir, a high voltage-blocking valve and a control unit. In this version, the high voltage-blocking valve has a first port coupled to the coating material source, a second port coupled to the reservoir, and a third port coupled to the dispenser. The valve also has a first position and a second position. In the first position, the valve couples the first port to the second port while the third port is closed. This position permits coating material to flow from the source to the reservoir and keeps the third port and the dispenser electrically isolated from the reservoir and the coating material source. During this period, the dispenser does not dispense coating material. The control unit senses when the reservoir is full and triggers an actuator to switch the high voltage blocking valve to its second position. In the second position, the high voltage-blocking valve couples the second port to the third port while the first port is closed. This position permits coating material to flow from the reservoir to the dispenser and keeps the first port and the coating material source electrically isolated from the reservoir and the dispenser. During this period, the dispenser can dispense coating material onto articles to be coated by the coating material until the reservoir is empty.

According to an aspect of the invention, a valve has a housing and a component movable within the housing. The housing has first, second, third and fourth ports formed in it. The movable component has a first passageway formed in it. Movement of the movable component within the housing selectively connects the first port through the first passageway to the second port. The movable component is selectively movable to disconnect the first port and second port and to connect the second port through the first passageway to the third port. Means define between the housing and the movable component a second passageway. The fourth port is connected to the second passageway.

Further illustratively according to this aspect of the invention, the second passageway is defined between the movable component and an interior surface of the housing adjacent the movable component.

Additionally, illustratively according to this aspect of the invention, the housing includes a fifth port connected to the second passageway. The fifth port is used as an exit for the non-conductive solvent. Illustratively, the second passageway is defined between the movable component and an interior surface of the housing adjacent the movable component and between the fourth port and the fifth port.

Further illustratively according to this aspect of the invention, the housing comprises a sixth port and the movable component comprises a third passageway. Movement of the movable component within the housing alternately connects the first port and the second port through the first passageway and the third port and the sixth port through the third passageway, or the first port and the sixth port through the third passageway and the second port and the third port through the first passageway.

According to another aspect of the invention, a coating system comprises a source of electrically non-insulative coating material, a dispenser for dispensing the coating material toward an article to be coated thereby, an electrostatic high potential supply for supplying charge to the coating material, means for coupling the high potential supply across the dispenser and the article, a first reservoir, and a first valve. The first valve has a first housing providing first, second, third, fourth and fifth ports, and a first component movable within the first housing and having a first passageway selectively to connect the first port to the second port to permit the flow of coating material from the first port to the second port. Means are provided for coupling the first port to the coating material source, the second port to the first reservoir, and the third port to the dispenser. The first component is movable within the housing selectively to connect the second port to the third port to permit the flow of coating material from the first reservoir to the dispenser. A source is provided for an electrically non-conductive fluid. Means define between the first housing and the first movable component a second passageway, and means couple the source of electrically non-conductive fluid to the fourth port to provide a flow of the electrically non-conductive fluid from the source of electrically non-conductive fluid through the second passageway to flush coating material from surfaces of the first housing and first movable component adjacent the second passageway and exit from the fifth port.

Illustratively according to this aspect of the invention, the first reservoir comprises a first piston and cylinder. The first piston is reciprocable in the first cylinder. The first reservoir is defined between a surface of the first piston and a first head of the first cylinder.

Further illustratively according to the invention, the first head comprises a sixth port. The means for coupling the second port to the first reservoir comprises the sixth port. The first cylinder has a second head at an end thereof opposite the first head. The second head comprises a seventh port. A source of driving fluid is selectively coupled to the seventh port for pumping the coating material from the first reservoir to the dispenser or to exhaust driving fluid from the seventh port to permit coating material from the coating material source to flow into the first reservoir through the first and second ports.

According to this embodiment, means are provided for synchronously operating the first valve and the means for selectively coupling the seventh port to the driving fluid source. Means are provided for sensing the position of the first piston in the first cylinder. Means are provided for coupling the first piston position-sensing means to the means for operating the first valve and the means for selectively coupling the seventh port to the driving fluid source.

Additionally, illustratively according to this embodiment of the invention the apparatus further comprises a second reservoir, a second valve having a second housing provided with eighth, ninth, tenth and eleventh ports, means for coupling the eighth port to the second reservoir, means for coupling the ninth port to the dispenser, and means for coupling the tenth port to a source of coating material. A second component is movable within the second housing and has a third passageway selectively to connect the eighth port to the ninth port to permit the flow of coating material from the second reservoir through the eighth port, the third passageway, and the ninth port to the dispenser. The second component is movable within the second housing selectively to connect the eighth port to the tenth port to permit the flow of coating material from the tenth port to the eighth port. Means define between the second housing and the second movable component a fourth passageway. Means couple the source of electrically non-conductive fluid to the eleventh port to provide a flow of the electrically non-conductive fluid from the source of electrically non-conductive fluid through the eleventh port and fourth passageway to flush coating material from surfaces of the second housing and second movable component adjacent the fourth passageway.

Further illustratively according to this aspect of the invention, the second and fourth passageways are defined between the first and second movable components, respectively, and interior surfaces of the first and second housings, respectively, adjacent the first and second movable components, respectively.

Additionally illustratively according to this aspect of the invention, the first housing comprises a fifth port. At least a portion of the electrically non-conductive fluid flow supplied through the fourth port also flows through the fifth port. The second housing comprises a twelfth port. At least a portion of the electrically non-conductive fluid flow supplied through the eleventh port also flows through the twelfth port. Illustratively, the second passageway is defined between the first movable component and an interior surface of the first housing adjacent the first movable component and between the fourth port and the fifth port, and the fourth passageway is defined between the second movable component and an interior surface of the second housing adjacent the second movable component and between the eleventh port and the twelfth port.

Further according to this aspect of the invention, the first and second reservoirs together comprise a first double-acting fluid piston and cylinder. The piston is reciprocable in the cylinder and provides first and second opposed piston surfaces. The first reservoir is defined between the first piston surface and a first head of the first cylinder. The first cylinder has a second head at an end thereof opposite the first head. The second reservoir is defined between the second piston surface and the second head. The first head is provided with a sixth port. The means for coupling the second port to the first reservoir comprises the sixth port. The second head is provided with a seventh port. The means for coupling the eighth port to the second reservoir comprises the seventh port. Means are provided for alternately and selectively actuating the first and second valves for alternately coupling the coating material source to the first reservoir and second reservoir to the dispenser to pump coating material from the second reservoir to the dispenser, and the coating material source to the second reservoir and first reservoir to the dispenser to pump coating material from the first reservoir to the dispenser.

Additionally according to this aspect of the invention, the first housing further comprises a sixth port and the first component comprises a third passageway. The apparatus includes a second reservoir, and means for coupling the sixth port to the second reservoir. Movement of the first component in the first housing to connect the first port to the second port connects the third port to the sixth port to permit the flow of coating material from the second reservoir to the dispenser. Movement of the first component in the first housing to connect the first port to the sixth port to permit the flow of coating material from the coating material source to the second reservoir connects the second port to the third port to permit the flow of coating material from the first reservoir to the dispenser.

According to another aspect of the invention, a circuit is provided for the circulation of solvent to and from a valve having a movable component and a housing for movably housing the movable component. The movable component has a first orientation with respect to the housing in which it permits the flow of a valved fluid from the valve through a first port provided on the valve and a second orientation with respect to the housing in which it permits the flow of the valved fluid from the valve through a second port provided on the valve. The circuit includes a second passageway provided between the movable component and the housing. A fourth port is provided on the housing for the introduction of the solvent into the housing and a fifth port is provided on the housing for removal of the solvent from the housing. The second passageway couples the fourth port to the fifth port. A reservoir is provided for the solvent, along with means for coupling the fourth and fifth ports to the reservoir.

Illustratively according to this aspect of the invention, the means for coupling the fourth and fifth ports to the reservoir comprises a pump having a sixth input port and a seventh output port, means for coupling the sixth port to the reservoir and means for coupling the seventh port to the fourth port.

Additionally illustratively according to this aspect of the invention, the means for coupling the fifth port to the reservoir comprises a filter having a eighth input port and a ninth output port. Means are provided for coupling the fifth port to the eighth port and for coupling the ninth port to the reservoir.

Illustratively according to this aspect of the invention, the filter comprises a renewable filter element.

Additionally according to this aspect of the invention, the circuit further comprises a container having an inlet port and an outlet port. Solvent flows into the inlet port, through the container and from the outlet port. Molecular sieves are located in the container for separating from the solvent flowing into the inlet port a component to be removed from the solvent flowing from the outlet port.

Illustratively according to this aspect of the invention, the molecular sieves are renewable.

Additionally illustratively according to this aspect of the invention, the reservoir comprises a drain for permitting drainage of sediment from the reservoir and a second valve for controlling flow through the drain.

Further illustratively according to this aspect of the invention, the reservoir comprises a solvent inlet chamber and a solvent outlet chamber. A partition separates the solvent inlet chamber and the solvent outlet chamber. The means for coupling the fourth and fifth ports to the reservoir comprises means for coupling the fifth port to the solvent inlet chamber and means for coupling the fourth port to the solvent outlet chamber.

According to yet another aspect of the invention, a protocol is provided for testing a potential solvent for its ability to strip a coating material from a fluid circuit. The fluid circuit supplies the coating material to a dispenser from which the coating material is dispensed. The protocol comprises providing a container of the solvent to be tested, placing into the potential solvent a droplet of the coating material, immediately observing the behavior of the droplet in the potential solvent, eliminating the potential solvent if the droplet does not at least partially disperse in the potential solvent, later observing the behavior of the coating material in the potential solvent, and eliminating the potential solvent if a noticeable precipitate of a component of the coating material has not formed in the potential solvent.

Illustratively according to this aspect of the invention, the protocol further comprises measuring the electrical bulk resistivity of the potential solvent, and eliminating the potential solvent if its measured electrical bulk resistivity is not >100 Ω-cm.

BRIEF DESCRIPTION OF THE DRAWINGS

The invention may best be understood by referring to the following detailed description and accompanying drawings which illustrate the invention. In the drawings:

FIG. 1 illustrates highly diagrammatically a system constructed according to the present invention;

FIG. 2 illustrates highly diagrammatically another system constructed according to the present invention;

FIG. 3 illustrates highly diagrammatically another construction of a detail of the system illustrated in FIG. 2;

FIGS. 4*a–b* illustrate highly diagrammatically another system constructed according to the present invention;

FIG. 5 illustrates highly diagrammatically another system constructed according to the present invention;

FIG. 6 illustrates a sectional elevational view of a valve constructed according to the present invention, with the section being taken along the axis of the valve;

FIG. 7 illustrates a sectional elevational view of the housing of the valve illustrated in FIG. 6, with a section being taken in the same direction as FIG. 6;

FIG. 8 illustrates a sectional view of the valve housing illustrated in FIGS. 6–7, taken along section lines 8—8 of FIGS. 6–7;

FIG. 9 illustrates a sectional plan view of another valve constructed according to the present invention, with the section being taken transverse to the axis of the valve;

FIGS. 10*a–b* illustrate schematically sectional side elevational views of two alternative portions of a system constructed according to the present invention;

FIG. 11 illustrates schematically a sectional side elevational view of a portion of a system constructed according to the present invention;

FIGS. 12*a–c* illustrate side elevational views of beakers containing potential solvent-coating material mixtures illustrating a solvent testing protocol according to the present invention;

FIG. 13 illustrates plots of both high magnitude potential source current (in μA) versus number of valve operating cycles (left ordinate and abscissa), and solvent bulk resistivity (in MΩ-cm) versus number of valve operating cycles (right ordinate and abscissa);

FIG. 14 illustrates, partly schematically, a portion of a coating material supply and dispensing system according to another embodiment of the invention, with the coating material supply valve and reservoir illustrated in transverse section and longitudinal section, respectively;

FIGS. 14*a–c* illustrate sectional views of three alternative details to a detail of the coating material supply valve illustrated in FIG. 14;

FIG. 15 illustrates a sectional view of the coating material supply valve of FIG. 14, taken generally along section lines 15—15 of FIG. 14;

FIGS. 15*a–b* illustrate sectional views through a coating material supply valve constructed according to another embodiment of the present invention;

DETAILED DESCRIPTIONS OF ILLUSTRATIVE EMBODIMENTS

As used herein, the term "electrically non-conductive" means electrically more insulative than the term "electrically conductive." The term "electrically non-insulative" means electrically more conductive than the term "electrically insulative." As used herein, the term "solvent" means any material or material mixture that will dissolve, suspend, emulsify or otherwise act to remove and carry away coating material residue from components of the system described herein. The solvent functions to remove the paint film from inside surfaces of the valve and carry away the paint residue. The disclosed solvents are electrically highly insulative to prevent current conduction between coating material ports on the valve of the invention. The coating material ports are also spaced apart a sufficient distance that the dielectric strength of the solvent between the coating material ports on the valve prevents arcing between the coating material ports. Illustratively, the distance separating the ports is larger than about one inch (about 2.5 cm), and in an illustrative embodiment the movable component of the valve has a diameter of about 2.36 inches (about 6 cm). The solvent thus should meet the criteria of being electrically non-conductive, having minimal ability to suspend coating material solids, and have adequate coating material stripping or cleaning power.

The invention is disclosed in the context of several systems for atomizing and dispensing electrostatically charged particles of coating materials that are bulk electrical non-insulators such as water-based coating materials. However, it is believed to be useful in other contexts as well.

Figure 1:
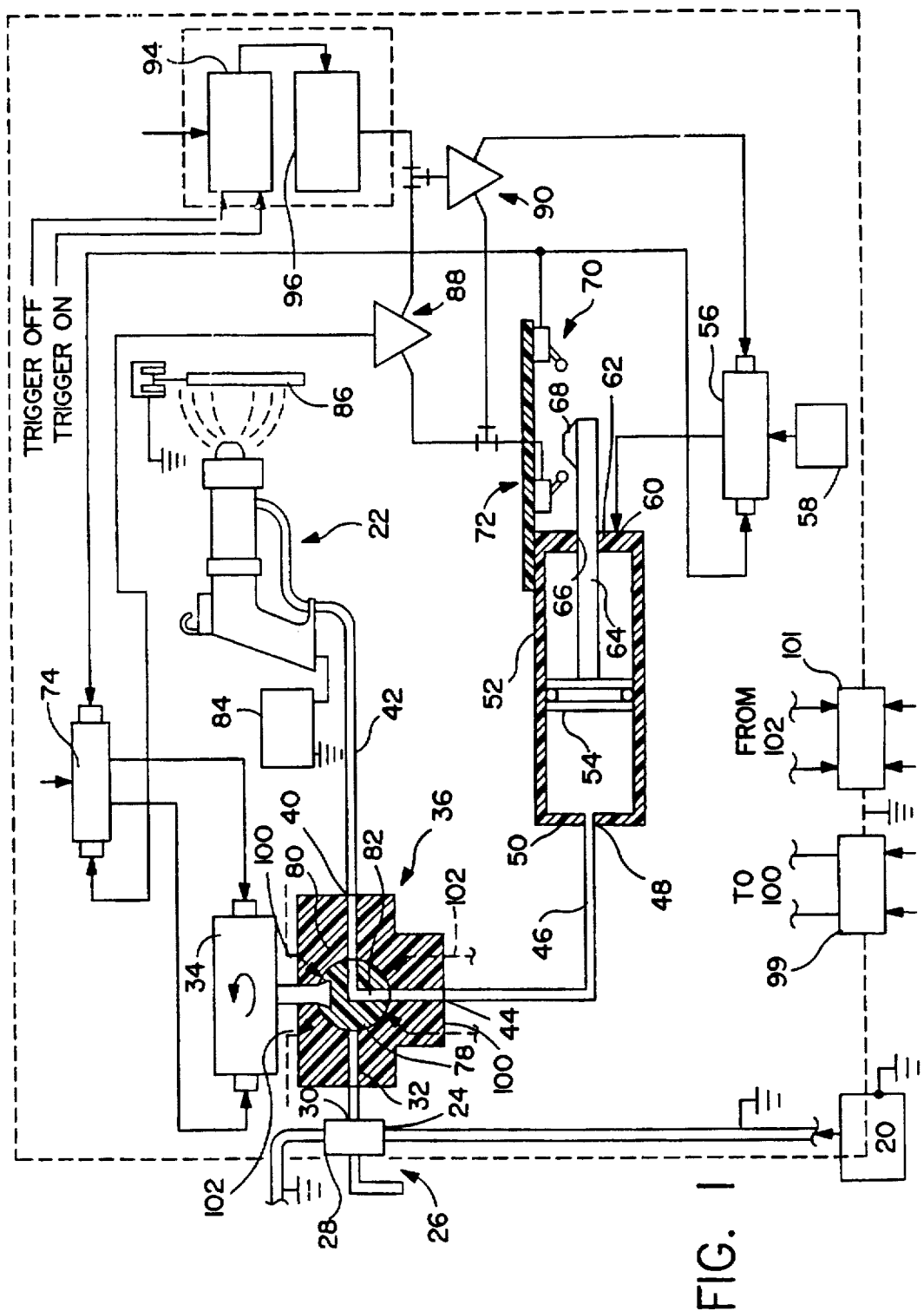

Referring now to FIG. 1, a system according to the present invention supplies water-base coating material from an electrically grounded reservoir 20 to a dispenser 22 at high voltage such as, for example, a manual handgun of the general type illustrated in U.S. Pat. No. 3,169,882. Coating material is supplied to a first input port 24 of a first, manual three-way valve 26. Another input port 28 of valve 26 is coupled to a grounded supply of water which functions as a solvent for cleaning the system of FIG. 1 during, for example, color change. An output port 30 of three-way valve 26 is coupled to an input port 32 of an actuator 34-powered three-way valve 36. The illustrated valve 36 is a ball valve, but cylindrical, spool-type, and other types of three way valves can also be used in this application. The essential attributes of valve 36 will be discussed in greater detail hereinafter. Valve 36 has an output port 40 which is coupled through a fluid line 42 to dispenser 22. Valve 36 has a common, or, input/output, port 44 which is coupled through a fluid line 46 to an input/output port 48 in a head 50 of a fluid reservoir cylinder 52.

A piston 54 is reciprocated in cylinder 52 away from head 50 by fluid flowing into cylinder 52 through port 48. Piston 54 is reciprocated toward head 50 by compressed air supplied through a three-way air valve 56 from a compressed air source 58 to an air inlet/outlet port 60 in a head 62 of cylinder 52. Piston 54 is provided with a piston rod 64 which reciprocates in an opening 66 formed in head 62. An actuator 68 on the end of rod 64 outside cylinder 52 cooperates with position sensors on two pneumatic switches 70, 72 to define the limits of piston 54 travel. At maximum coating material volume under head 50, switch 70 switches air valve 56 on, supplying compressed air through port 60 in head 62 to force coating material from port 48. A four-way air valve 74, which also receives a piston 54 travel limit signal from switch 70, signals actuator 34 which rotates the moving component 78 90° relative to the housing 80 of valve 36. This conditions valve 36 to supply the coating material from under head 50 through fluid line 46, through the valve passageway 82 in moving component 78, and through fluid line 42 to dispenser 22 for electrostatic charging by a supply 84 and atomization to coat an article 86.

As piston 54 approaches the head 50 limit of its travel, pneumatic switch 72 closes, signalling four-way air valve 74 and three-way air valve 56 through respective control valves 88, 90. The signal to four-way air valve 74 causes actuator 34 to rotate the moving component 78 of valve 36 90° in the other direction with respect to housing 80, cutting off the supply of coating material through fluid line 42 to dispenser 22 and conditioning valve 36 to supply more coating material from reservoir 20 through valve 26, through valve 36, through fluid line 46 and through port 48 to reservoir 52. This process is repeated as often as required to complete coating of one or more articles 86 to be coated by dispenser 22.

Sometimes it is necessary or convenient to be able to place the system illustrated in FIG. 1 in one or the other of its states. This might be the case, for example, when the system is to be flushed prior to changing the color of the material being dispensed. In such circumstances, a "trigger on" or "reset" signal or a "trigger off" or "start" signal can be sent through a pneumatic timer 94, a pneumatic pulse shaper 96 and control valves 88, 90. These signals place valves 56 and 74 in the same conditions as do the signals generated by pneumatic limit switches 70, 72. They permit the reservoir 52 to be partially filled, for example, with water or another solvent for the coating material and then emptied through the dispenser 22 to flush remaining coating material from the circuit 26, 36, 42, 22, 46, 52. The circuit is then ready to receive the next color of coating material. A quick disconnect can be provided at port 24 for convenience in color change. The system includes an inlet manifold 99, inlets 100, an outlet manifold 101 and outlets 102 to circulate in housing 80 an electrically non-conductive solvent. This solvent circulation provides a means to isolate the high-magnitude voltage port 40 from low-magnitude voltage port 32 of housing 80. The solvent circulation washes away coating material film from the internal surfaces of valve 36 including the surface of the movable component 78. In one position of valve 36 port 44 is connected to port 40 (see FIG. 1). In this case port 44 is at high voltage and must be isolated from port 32. In the other position of valve 36 port 44 is connected to the grounded port 32 and must be isolated from port 40. The coating material, the system and the articles 86 to be coated by the dispensed coating material must be able to tolerate minute quantities of the electrically non-conductive solvent for reasons which will be explained.

Figure 2:
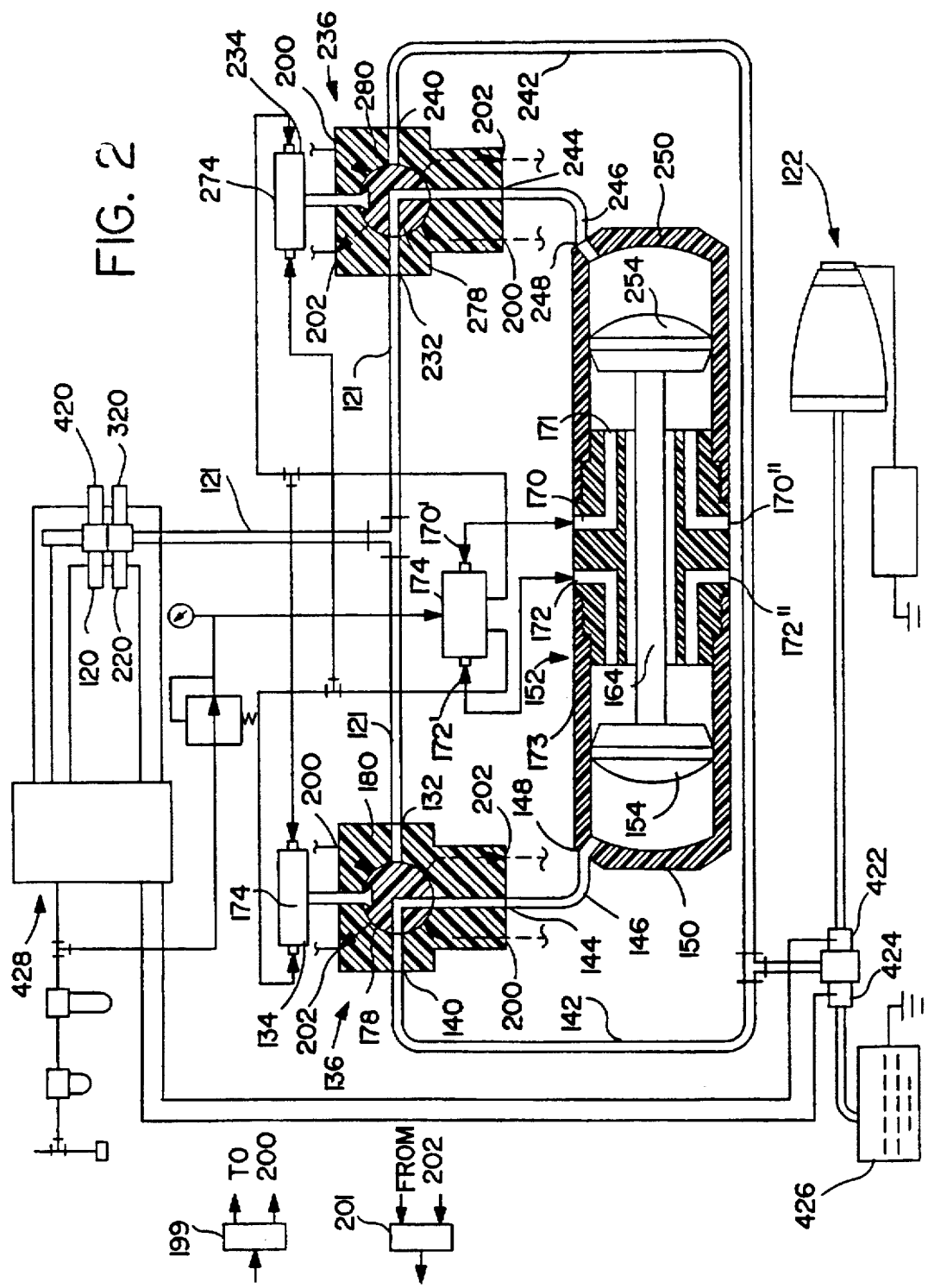

In the embodiment of the invention illustrated in FIG. 2, two three-way valves 136, 236 and a double acting cylinder reservoir 152 are employed. Coating material, illustratively from a selected one of three grounded supplies through a selected one of manifold valves 120, 220, 320, is provided through fluid conduits 121 to ports 132, 232 of valves 136, 236, respectively. The inlet/outlet, or common, ports 144, 244 of valves 136, 236, respectively, are coupled to inlet/outlet ports 148, 248, in heads 150, 250 at the ends of cylinder reservoir 152. Pistons 154, 254, joined by a connecting rod 164, close the reservoirs under heads 150, 250, respectively. Low superatmospheric pressure compressed air pilot signals are provided to input ports 170, 172 of a cylinder 152 so that the travel limits of pistons 154, 254 can be sensed. The cylinder reservoir heads 150, 250 are concave and the pistons 154, 254 are complementarily convex to reduce flushing time and locations for pockets of coating material which might otherwise be more resistant to being flushed from the cylinder reservoir 152. The pneumatic sensing circuit for the travel limits of pistons 154, 254 in the cylinder reservoir 152 comprises the double-piloted, four-way pneumatic valve 174 which controls the operation of the pneumatic actuators 134, 234 controlling the operation of the ball valves 136, 236. The pilots 170', 172' of the four-way pneumatic valve 174 operate on a pressure balance principle. A low volume of air continuously bleeds from each pilot port 170', 172'. Pneumatic tubing couples each of the pilot ports 170', 172' to a respective port 170, 270 in the center section of the cylinder 152. The air escapes from the cylinder 152 through exhaust ports 170", 172" also provided in the cylinder 152 center section. As one or the other of the pistons 154, 254 bottoms out against its respective distal end 173, 171 of port 172, 170 at an end of its stroke, its respective port 172, 170 is momentarily obstructed, causing pressure to increase at the respective port 172', 170' of piloted four-way pneumatic valve 174. This, in turn, causes its respective actuator 134, 234 to be actuated, rotating the balls of ball valves 136, 236 to shift and returning pistons 154, 254 in the opposite direction.

With the system components in the orientations illustrated in FIG. 2, port 232 of valve 236 and port 244 of valve 236 are connected while port 240 of valve 236 is closed off by the movable component 278 of valve 236, port 140 of valve 136 and port 144 of valve 136 are connected while port 132 of valve 136 is closed off by the movable component 178 of valve 136, coating material is being supplied from under head 150 as the pistons 154, 254 are moved to the left by coating material under pressure filling the space under head 250, flowing from the selected color valve 120, 220, 320 through fluid lines 121, valve 236 and a fluid line 246. As this occurs, coating material is being supplied to a coating material dispenser 122 from under head 150 through a fluid line 146, valve 136 and a fluid line 142 connected to output port 140 of valve 136. Dispenser 122 illustratively is a DeVilbiss Ransburg AEROBELL™ type 33 liquid rotary atomizer available from ITW Ransburg Electrostatic Systems, 320 Phillips Avenue, Toledo, Ohio 43612. As piston 254 reaches the limit of its travel toward port 170, a piloted four-way pneumatic valve 174 senses a slight pressure increase at its pilot port 170' owing to the presence of piston 254 at the opening of port 170 into cylinder 152 and switches actuators 174, 274 rotating the movable components 178, 278 90° with respect to housings 180, 280 respectively. The result of valve switching would be to connect ports 132 and 144 of valve 136 while port 140 would be closed off by the movable component 178 of valve 136 and connect ports 244 and 240 of valve 236 while port 232 of valve 236 would be closed off by the movable component 278 of valve 236. This would connect the reservoir under head 150 through fluid line 146, valve 136 and fluid lines 121 to the coating material supply through the selected color valve 120, 220, 320. Coating material under pressure begins to flow under head 150 pushing pistons 154 and 254 to the right, forcing coating material previously stored under head 250 out through fluid line 246, valve 236 and fluid line 242 to be dispensed by dispenser 122.

These steps are repeated until it is desired to flush the selected color from the system, for example, to effect a color change. At that time, the selected color valve 120, 220, 320 is closed and a solvent valve 420 is opened, providing a supply of solvent, for example, water, to the system so that the pre-flush color can be purged from it. The system is driven through a multiple of the above-described cycle to purge it, then filled with the next selected color by closing valve 420 and opening a selected valve 120, 220, 320 and charging the system with that selected color. A trigger valve 422 and a dump valve 424 cooperate to steer whatever fluid the system is charged with either to the dispenser 122, which is maintained at high magnitude electrostatic potential, or to a typically grounded dump tank 426 for recovery. Since the dump tank 426 is grounded, and since electrically conductive coating material residue may remain in the conduit extending to the dump tank 426 at the end of a flushing cycle, it may be necessary to pass drying air through the conduit extending to the dump tank to maintain the insulated integrity of the system. Alternatively, the conduit extending to the dump tank can be isolated from ground, for example, by a twelve inch (approximately 31 cm) air gap. As with the embodiment of FIG. 1, an inlet manifold 199, inlets 200, an outlet manifold 201 and outlets 202 for an electrically non-conductive solvent to circulate in housings 180, 280 as a means to isolate the high-magnitude voltage and low-magnitude ports of housings 180, 280 and to wash away coating material film from inside surfaces of housing 180, 280 and from the surfaces of movable components 178, 278 are provided in the housings 180, 280 of valves 136, 236, respectively. A suitable process controller 428, such as a programmable logic controller (PLC) or the like, is provided to control the coating and flushing processes conducted by the FIG. 2 system.

PLC 428 can be used to minimize the color change sequence time. To minimize this time, PLC 428 oscillates the ball valves 136, 236 between their two positions in short, timed cycles, limiting the piston 154, 254 strokes from their respective heads 150, 250. These strokes can be limited to inches or less, permitting reservoir 152 to be cleaned rapidly without having to undergo (a) complete piston 154, 254 stroke(s), minimizing flushing time and the volume of flushing material used.

Figure 3:
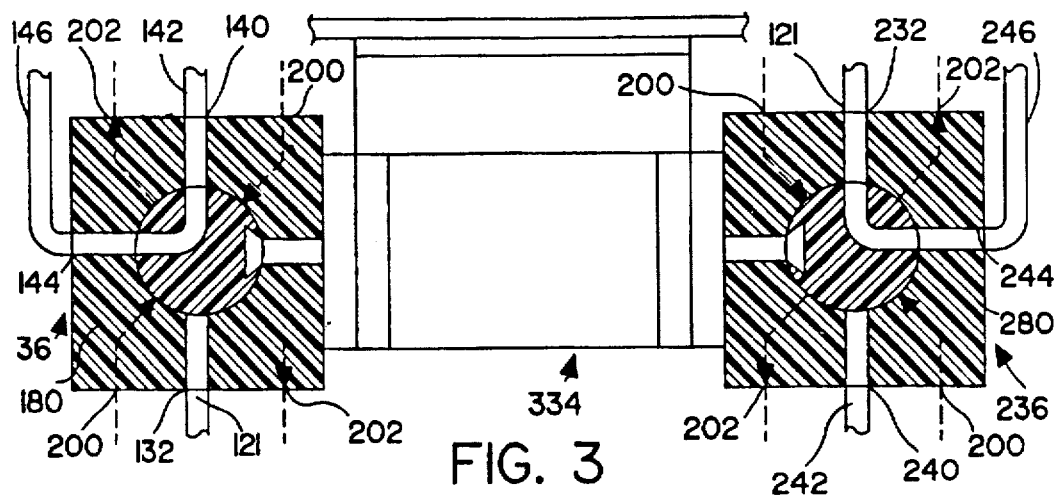

A detail of an alternative embodiment to the embodiment of FIG. 2 is illustrated in FIG. 3. In the embodiment of FIG. 3, the functions of valve actuators 134, 234 are incorporated into a single actuator 334. Otherwise the system, details of which are illustrated in FIG. 3, is the same as the system illustrated in FIG. 2. Accordingly, the same reference numbers are employed in FIG. 3 as in FIG. 2.

Figure 4A:
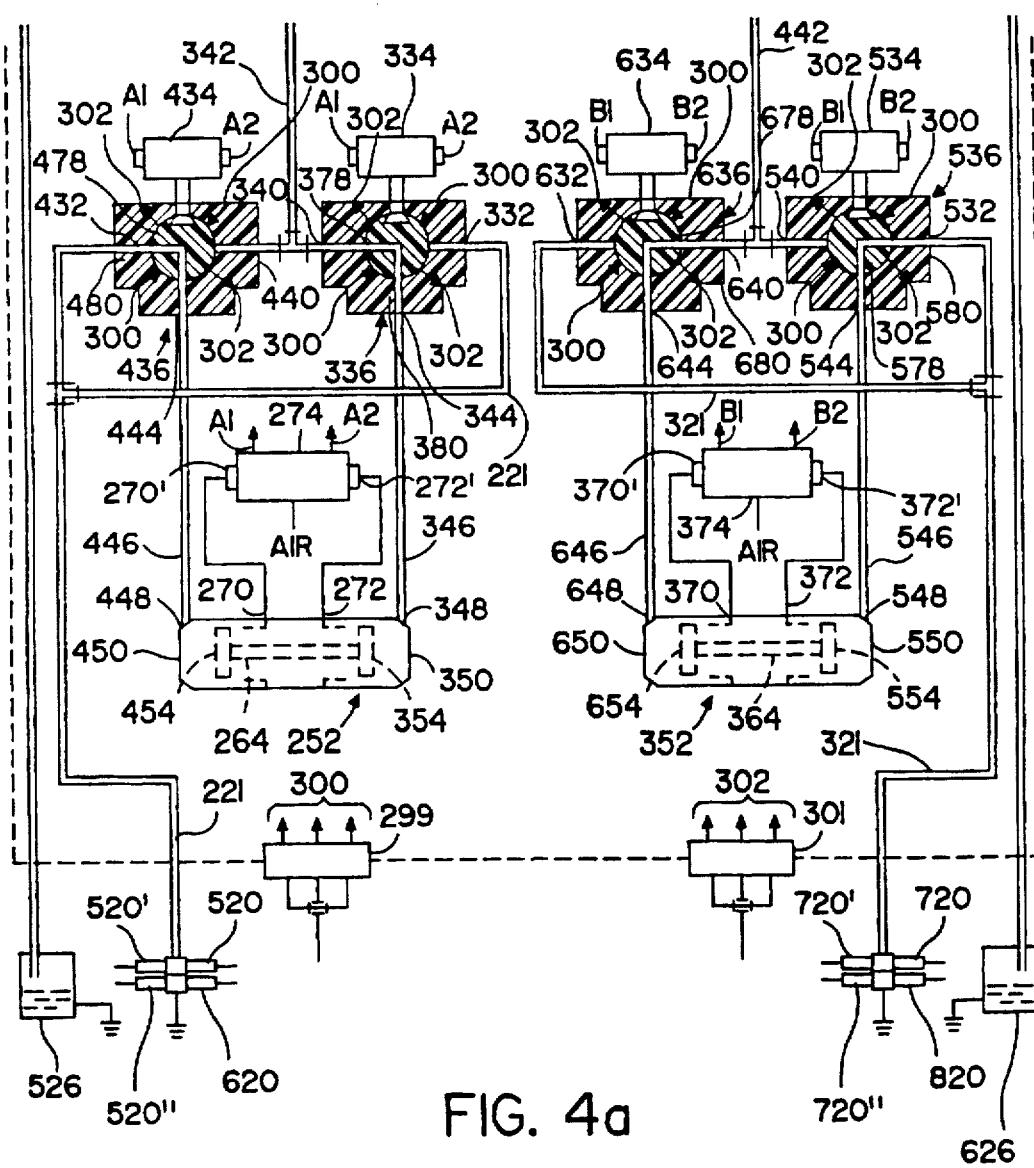
Figure 4B:
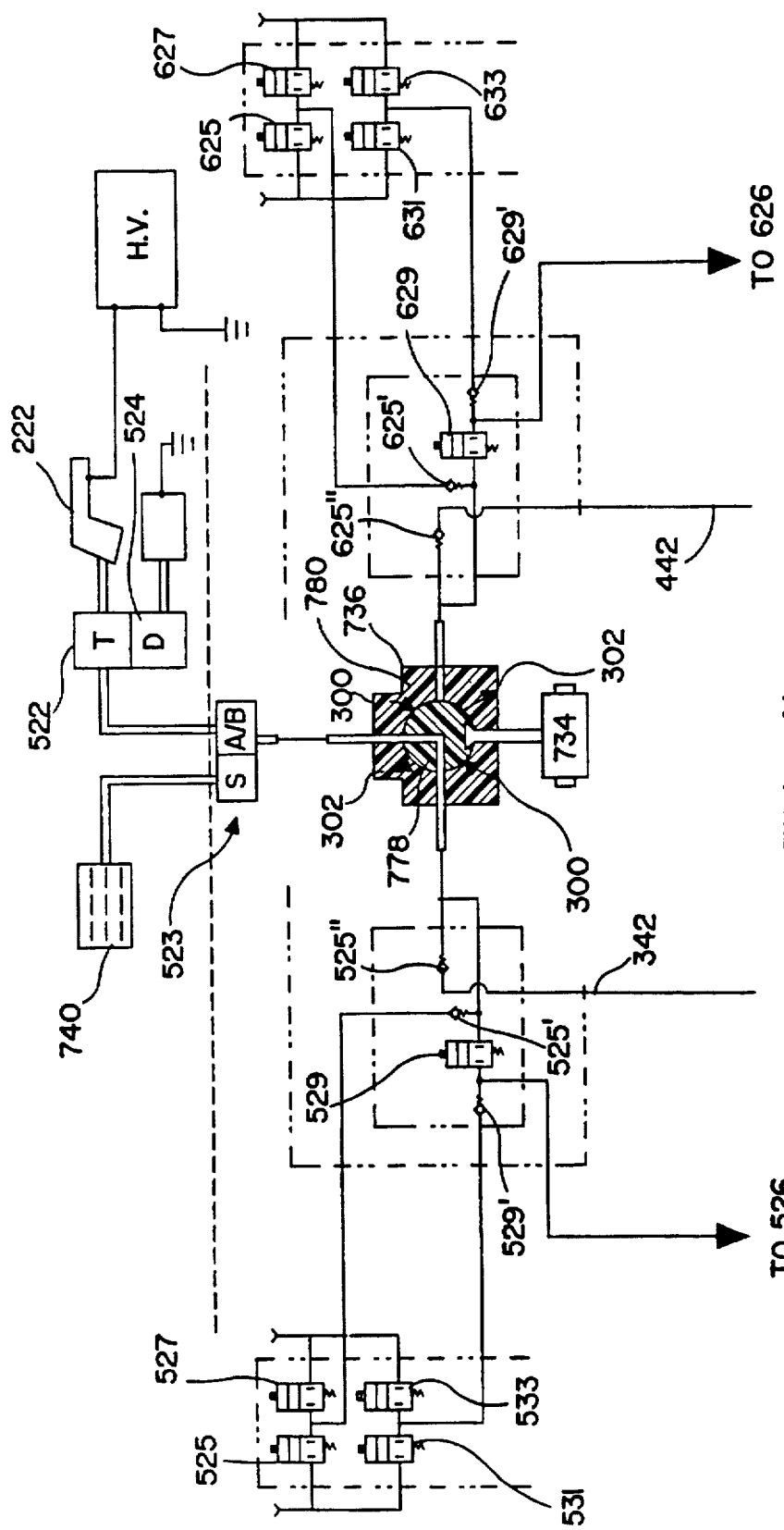
Figure 6:
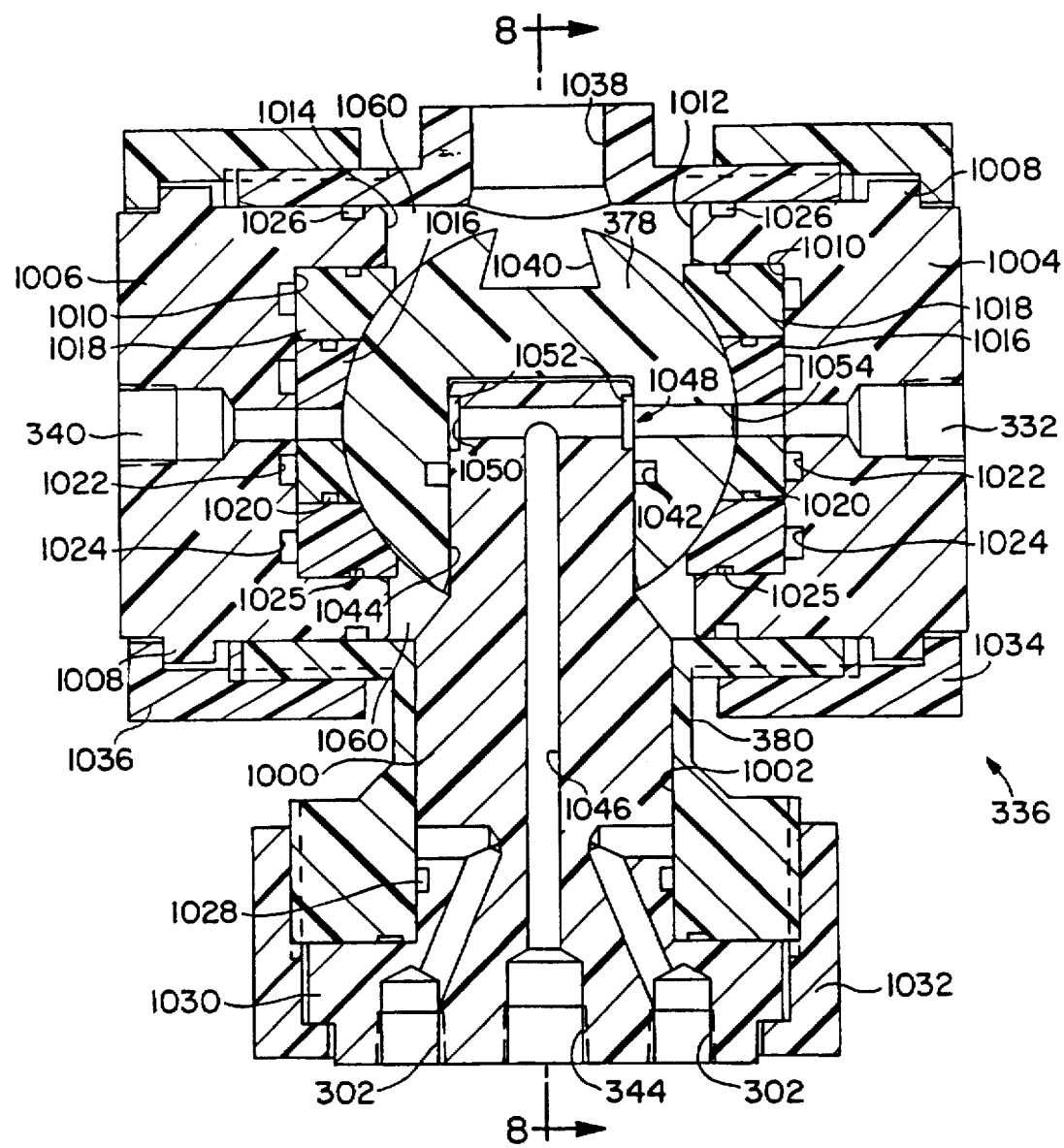
Figure 7:
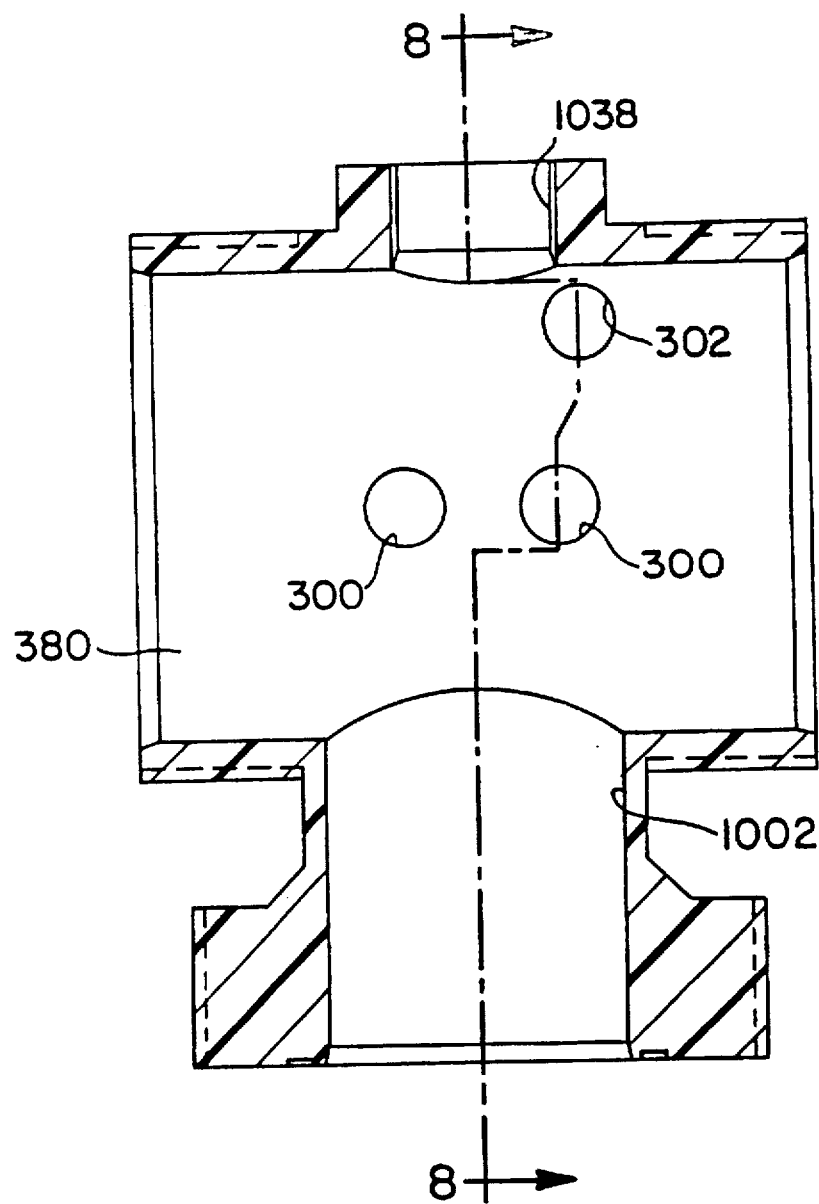
Figure 8:
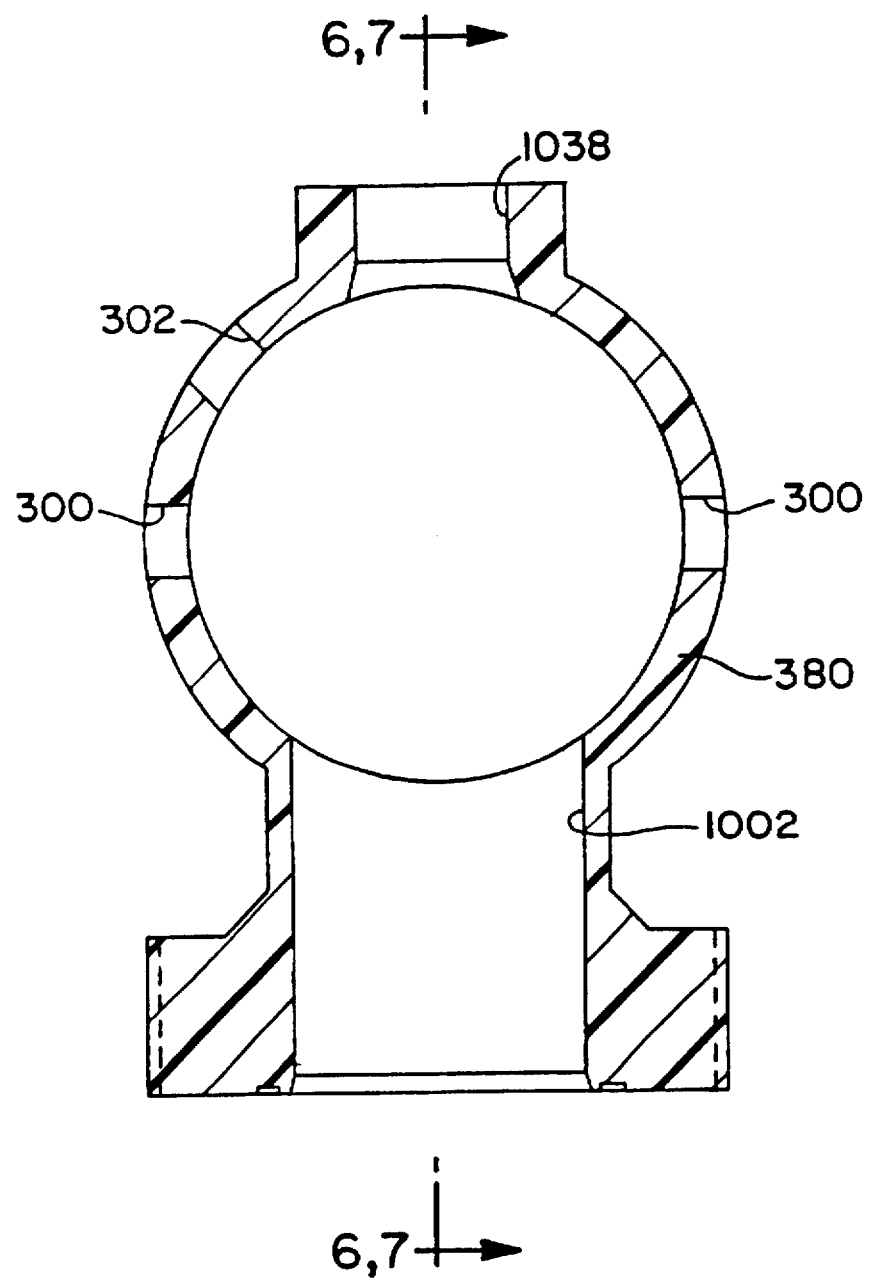
Figure 9:
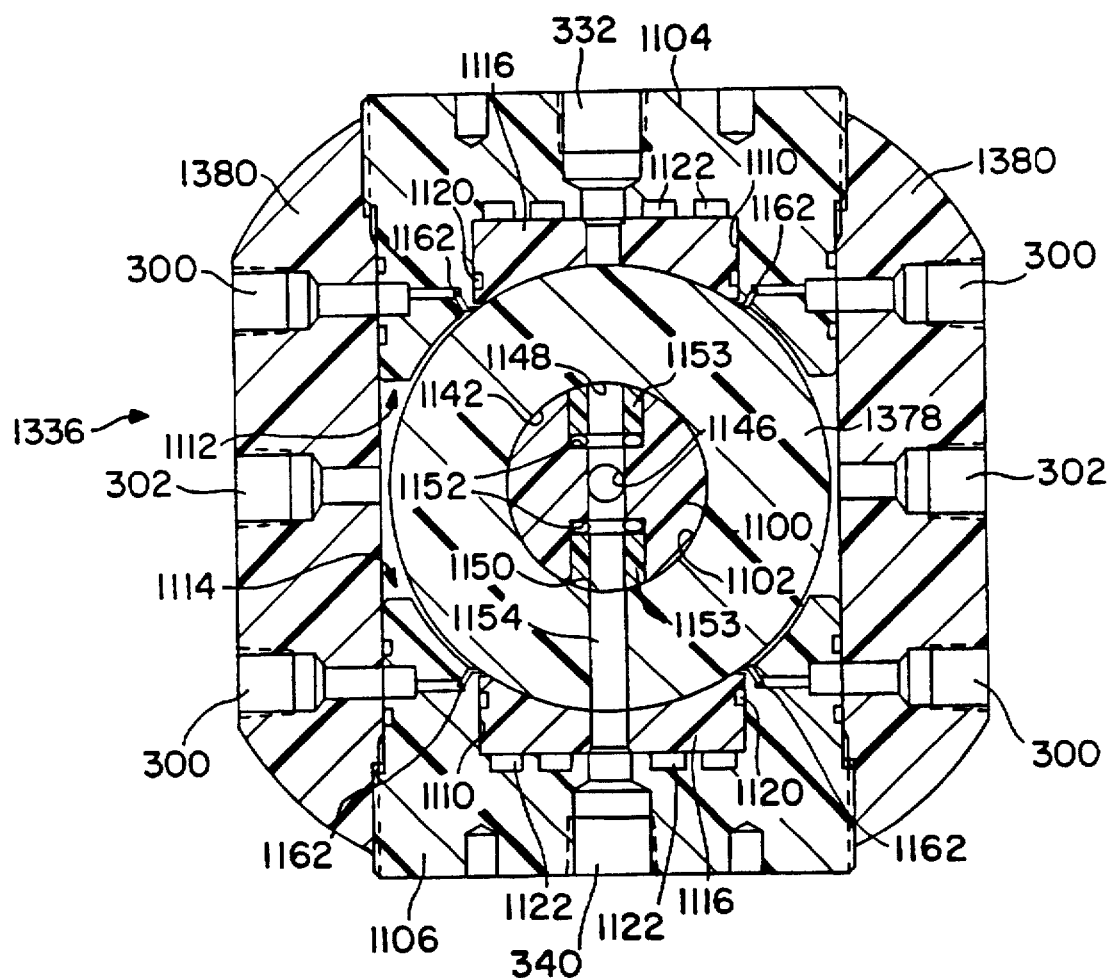

In the embodiment of the invention illustrated in FIGS. 4a–b, time delays associated with the flushing of a prechange color from the system illustrated in FIG. 2 are virtually eliminated. In the embodiment of the invention illustrated in FIGS. 4a–b, two FIG. 2 systems are placed in parallel. In the "A" system illustrated on the left in FIG. 4a, two three-way valves 336, 436 and a double acting cylinder reservoir 252 are employed. Coating material, which illustratively is one of three different coating materials supplied through separate valves 520, 520', 520" on a common manifold with a solvent valve 620, is provided through fluid conduits 221 to ports 332, 432 of valves 336, 436, respectively. The inlet/outlet, or common, ports 344, 444 of valves 336, 436, respectively, are coupled to inlet/outlet ports 348, 448, in heads 350, 450 at the ends of cylinder reservoir 252. Pistons 354, 454, joined by a connecting rod 264, close the reservoirs under heads 350, 450, respectively. Low superatmospheric pressure compressed air pilot signals are provided to input ports 270, 272 of cylinder 252 so that the travel limits of pistons 354, 454 can be sensed. With the system components in the illustrated orientations, coating material is being supplied from under head 350 as the pistons 354, 454 are moved to the right by coating material under pressure filling the space under head 450, flowing from the source 520 through fluid lines 221, valve 436 and a fluid line 446. As this occurs, coating material is being supplied to a coating material dispenser 222 from under head 350 through a fluid line 346, valve 336, a fluid line 342 connected to output port 340 of valve 336, a check valve 525", a three-way valve 736 of the same type as valves 336, 436, a solvent-A/B valve 523, and a trigger valve 522.

As piston 454 reaches the limit of its travel toward port 270, a piloted four-way pneumatic valve 274 senses a slight pressure increase at its pilot port 270' owing to the presence of piston 454 at the opening of port 270 into cylinder 252. Valve 274 switches, switching actuators 334, 434 associated with valves 336, 436, respectively to then opposite positions. As a result, the reservoir under head 350 through fluid line 346, valve 336 and fluid lines 221 will be connected to coating material valve 520. Coating material under pressure begins to flow under head 350 moving pistons 354, 454 to the left, forcing coating material previously stored under head 450 out through fluid line 446, valve 436 and fluid line 342 to be dispensed by dispenser 222. These steps are repeated until it is desired to flush the coating material from the A circuit, for example, to effect a color change.

The high voltage supply to dispenser 222 is interrupted. The air supply to the valve 520 is removed, interrupting the supply of coating material through valve 520 to the A circuit. A solvent valve 525 is then opened for a time on the order of a few seconds, while dispenser 222 is triggered on to flush the coating material from the A circuit supplying dispenser 222 through valve 736. For this purpose, check valves 525', 525" are interposed in the line connecting valve 525 to valve 736, and line 342, respectively. Once valve 525 is triggered off, air valve 527 is triggered on for a time, again on the order of a few seconds, while the dispenser 222 is triggered on to dry the circuit between valve 527 and dispenser 222.

Actuator 734 is then actuated to rotate ball 778 to connect the B circuit to dispenser 222. High voltage is then reestablished across dispenser 222 and the article to be coated by coating material to be dispensed from the coating material B circuit. Air is supplied to valve 720, and coating with coating material controlled by valve 720 begins.

Coating material remaining in circuit A is then flushed from the A circuit by supplying air to solvent valve 620 and opening dump valve 529. Cylinder 252 is then operated through a number of cycles, illustratively four, accompanied by complementary actuation of valves 336, 436. This results in the solvent supply through valve 620 filling the A circuit up to valve 736 via check valve 525" and down to dump tank 526 via dump valve 529. Check valve 525' and a check valve 529' prevent the flow of solvent beyond the circuit just described. The air supply is then removed from solvent valve 620. The dump line is then evacuated and dried by actuating solvent valve 531 and air valve 533 sequentially. Coating material valve 520' is actuated by the application of air signal thereto to fill coating material circuit A with the coating material controlled by valve 520'. The directions of pistons 354, 454 in cylinder 252 are reversed a number of times, illustratively four, accompanied by the complementary actuation of actuators 334, 434 to fill circuit A with the coating material controlled by valve 520', the next coating material to be dispensed by dispenser 222.

At the same time that the A circuit on the left side of FIGS. 4a–b is being flushed to remove coating material from it, the B circuit on the right side of FIGS. 4a–b begins dispensing coating material as follows. Coating material, which illustratively is one of three different coating materials supplied through separate valves 720, 720', 720" on a common manifold with a solvent valve 820, is provided through fluid conduits 321 to ports 532, 632 of valves 536, 636, respectively. The inlet/outlet, or common, ports 544, 644 of valves 536, 636, respectively, are coupled to inlet/outlet ports 548, 648, in heads 550, 650 at the ends of a cylinder reservoir 352. Pistons 554, 654, joined by a connecting rod 364, close the reservoirs under heads 550, 650, respectively. Low superatmospheric pressure compressed air pilot signals are provided to input ports 370, 372 of cylinder 352 so that the travel limits of pistons 554, 654 can be sensed.

With the system B components in the orientations illustrated in FIG. 4a, as soon as valve 736 is actuated to its position not illustrated, coating material will be supplied from under head 550 as the pistons 554, 654 are moved to the right by coating material under pressure filling the space under head 650, flowing from the valve 720 through fluid lines 321, valve 636 and a fluid line 646. As this occurs, coating material will be supplied to coating material dispenser 222 from under head 550 through a fluid line 546, valve 536, a fluid line 442 connected to output port 540 of valve 536, a valve 625", three-way valve 736, solvent-A/B valve 523 and trigger valve 522.

As piston 654 reaches the limit of its travel toward port 370, a piloted four-way pneumatic valve 374 senses a slight pressure increase at its pilot port 370' owing to the presence of piston 654 at the opening of port 370 into cylinder 352. Valve 374 switches, switching actuators 534, 634 associated with valves 536, 636, respectively to their opposite positions. As a result, the reservoir under head 550 through fluid line 546, valve 536 and fluid lines 321 will be connected to coating material valve 720. Coating material under pressure begins to flow under head 550 moving pistons 554, 654 to the left, forcing coating material previously stored under head 650 out through fluid line 646, valve 636 and fluid line 442 to be dispensed by dispenser 222. These steps are repeated until it is desired to flush the coating material from the B circuit, for example, to effect a color change.

When it is time to begin dispensing the coating material controlled by valve 520', the high voltage supply to dispenser 222 is again interrupted. The air supply to valve 720 is removed, interrupting the supply of coating material through valve 720 to the B circuit. Solvent valve 625 is then opened for a few seconds while dispenser 222 is triggered on to flush coating material from the circuit B supplying dispenser 222 through valve 736. For this purpose, check valves 625', 625" are interposed in the line connecting valve 625 to valve 736, and line 442, respectively. Once valve 625 is triggered off, air valve 627 is triggered on for a few seconds while the dispenser 222 is triggered on to dry the circuit between valve 627 and dispenser 222. Actuator 734 is then actuated to rotate ball 778 to connect the A circuit to dispenser 222. High voltage is then reestablished across dispenser 222 and the article to be coated by coating material to be dispensed from the coating material A circuit. Air is supplied to valve 520', and coating with coating material controlled by valve 520' begins.

Coating material remaining in circuit B is then flushed from the B circuit by supplying air to solvent valve 820 and opening dump valve 629. Cylinder 352 is then operated through a number of cycles, illustratively four, accompanied by complementary actuation of valves 536, 636. This results in the solvent supply through valve 820 filling the B circuit up to valve 736 via check valve 625" and down to dump tank 626 via dump valve 629. Check valve 625' and a check valve 629' prevent the flow of solvent beyond the circuit just described. The air supply is then removed from solvent valve 820. The dump line is then evacuated and dried by actuating solvent valve 631 and air valve 633 sequentially. Coating material valve 720' is actuated by the application of air signal thereto to fill coating material circuit B with the coating material controlled by valve 720'. The directions of pistons 554, 654 in cylinder 352 are reversed a number of times, illustratively four, accompanied by the complementary actuation of actuators 534, 634 to fill circuit B with the coating material controlled by valve 720', the next coating material to be dispensed by dispenser 222.

As with the embodiments of FIGS. 1 and 2, an inlet manifold 299, inlets 300, an outlet manifold 301 and outlets 302 for an electrically non-conductive solvent to circulate in housings 380, 480, 580, 680, 780 of valves 336, 436, 536, 636, 736, respectively, as a means for isolating high-magnitude voltage and low-magnitude voltage ports of housings 380, 480, 580, 680, 780 and to wash away coating material film from inside surfaces of housings 380, 480, 580, 680, 780 and from the surfaces of movable components 378, 478, are provided in the housings 380, 480, 580, 680, 780 of valves 336, 436, 536, 636, 736, respectively.

A suitable process controller (not shown), such as a programmable logic controller (PLC) or the like, is provided to control the coating and flushing processes conducted by the FIG. 4 system. The A and B system flushing described thus far does not flush coating material from valves 736, 523, 522 or dispenser 222. A separate solvent (water) supply 740 is connected to solvent-A/B valve 523. Because these components are on the output high magnitude electrostatic potential side of the A and B systems, supply 740 is isolated from ground. The valve 736 actuator 734 may briefly be left in its illustrated "A" position if dispensing of the A color has just concluded, or in its "B" position if dispensing of the B color has just concluded. Once solvent has filled the A or B system, some is permitted to flow through valve 736 and dump valve 524 to a dump tank. Again, since the dump tank is grounded, and since electrically conductive coating material residue may remain in the conduit extending to the dump tank at the end of a flushing cycle, it may be necessary to pass drying air through the conduit extending to the dump tank to maintain the insulated integrity of the system. Alternatively, the conduit extending to the dump tank can be isolated from ground, for example, by a twelve inch (approximately 31 cm) air gap. Then the actuator 734 is switched to continue flushing of the A or B system "off-line." Any remaining flushing of components 523, 522 and 222 is effected through valve 523 from solvent supply 740.

Figure 5:
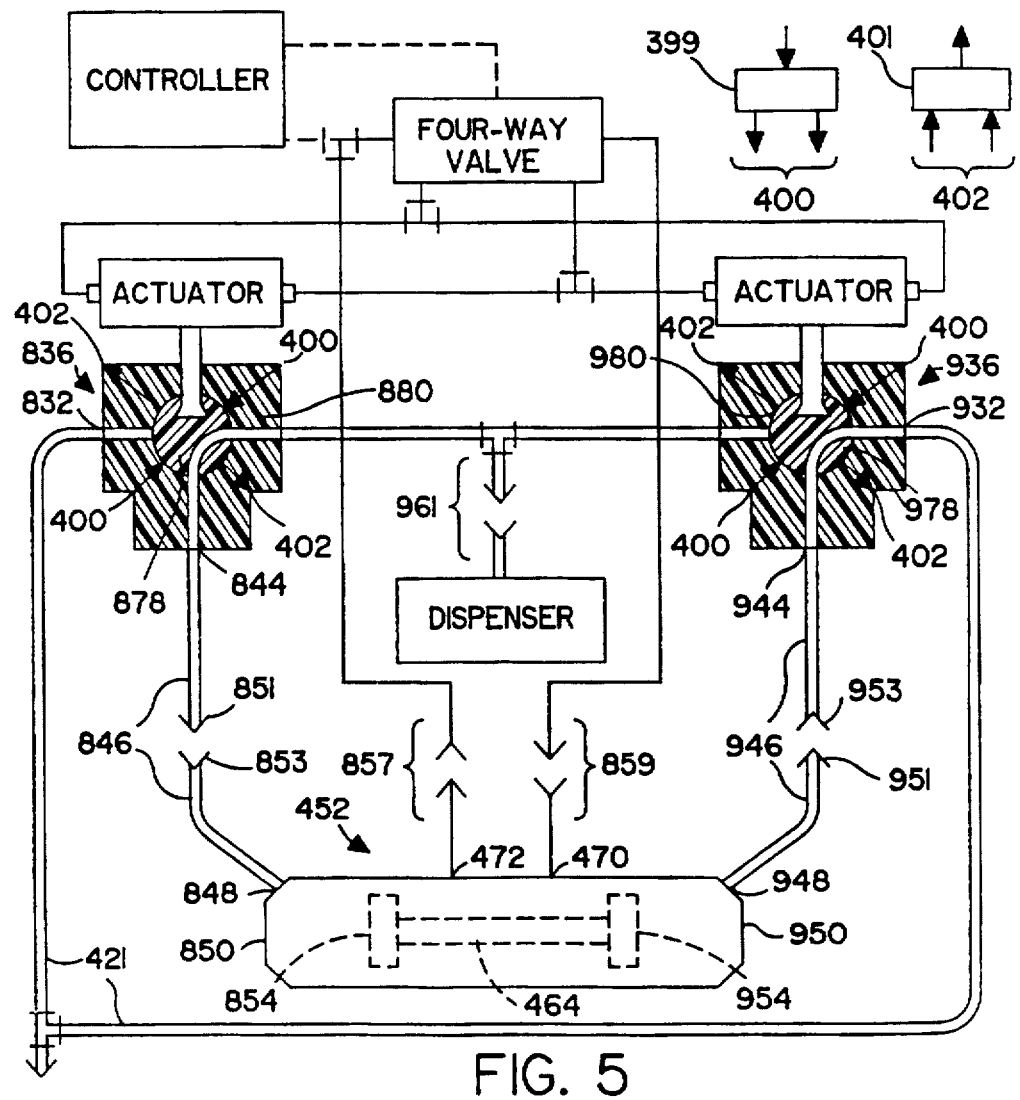

In the embodiment of the invention illustrated in FIG. 5, two three-way valves 836, 936 and a double acting cylinder reservoir 452 are employed. Coating material is provided through fluid conduits 421 to ports 832, 932 of valves 836, 936, respectively. The inlet/outlet, or common, ports 844, 944 of valves 836, 936, respectively, are coupled to inlet/outlet ports 848, 948, in heads 850, 950, respectively, at the ends of cylinder reservoir 452. Pistons 854, 954, joined by a connecting rod 464, close the reservoirs under heads 850, 950, respectively. Low superatmospheric pressure compressed air pilot signals are provided to input ports 470, 472 of cylinder 452 so that the travel limits of pistons 854, 954 can be sensed. An inlet manifold 399, inlets 400, an outlet manifold 401 and outlets 402 circulate an electrically non-conductive solvent around the valve balls 878, 978 and inside of housings 880, 980 of valves 836, 936, respectively.

The system functions in generally the same way as the system illustrated in FIG. 2 and previously described, except during flushing of the system, for example, prior to color change. In the system illustrated in FIG. 5, the fluid conduits 846, 946 extending between common ports 844, 944 of valves 836, 936, respectively, and ports 848, 948 in heads 850, 950, respectively, are provided with oppositely installed quick disconnects 851, 853; 951, 953, respectively. During flushing of the FIG. 5 system, cylinder reservoir 452 is removed from the circuit and any coating material remaining in it can be recycled or otherwise preserved for later use. Quick disconnects 851, 953 are coupled together and the flushing process is carried out without cylinder reservoir 452 in the system. This substantially reduces the system flushing time. After the system is flushed and dried as necessary by, for example, the passage of compressed air through some portion or all of the illustrated circuit, the same cylinder reservoir 452 or another cylinder reservoir can be coupled into the circuit and coating resumed. The replacement cylinder reservoir can either be precharged with a desired coating material or can be charged with coating material in situ prior to the initiation of the next coating dispensing cycle. Additional quick disconnects 857, 859 and 961 are provided for the pilot air conduits and the coating material conduit to the dispenser to aid in replacing cylinder reservoir 452.

The construction of the valves 36, 136, 236, 336, 436, 536, 636, 736, 836, 936 will now be described particularly with reference to FIGS. 6–9. Since these valves can be the same, the description will be of valve 336.

Valve 336 is a ball valve including a housing 380 which movably supports and houses a generally spherical ball 378. Ball 378 is mounted upon a generally right circular cylindrical bearing stem 1000 which extends through a generally right circular cylindrical passageway 1002 provided therefor in housing 380. Seal retainers 1004, 1006 are provided with radially outwardly extending retaining collars 1008. The valve seal retainers 1004, 1006 provide ports 332, 340, respectively. The retainers 1004, 1006 are also provided with reliefs 1010 in their facing surfaces 1012, 1014. Reliefs 1010 house two component 1016, 1018 valve seals. Component 1016 is the radially inner component of each seal. Component 1018 is the radially outer component of each seal. Grooves 1020 with O-ring seals are provided between the adjacent surfaces of seal components 1016, 1018. Grooves 1022 with O-ring seals are provided between the adjacent surfaces of components 1016 and retainers 1004, 1006. Grooves 1024, 1025 with O-ring seals are provided between the adjacent surfaces of components 1018 and retainers 1004, 1006. Grooves 1026 with O-ring seals are provided between the adjacent surfaces of retainers 1004, 1006 and housing 380. A groove 1028 with an O-ring seal extends around stem 1000 adjacent a radially outwardly extending retaining collar 1030.

Threaded retaining nuts 1032, 1034, 1036 cooperate with threads provided on housing 380 and with collars 1030, 1008 to secure stem 1000, seal retainer 1004 and seal retainer 1006, respectively, to housing 380. An opening 1038 is provided in housing 380 for the actuator 334 stem (not shown). The end of the actuator 334 stem is configured to engage in an undercut slot 1040 formed in ball 378. A groove 1042 with an O-ring seal extends around a central socket 1044 formed in ball 378 to receive the upper end of stem 1000. Stem 1000 is provided with a passageway 1046 which extends generally along the axis of rotation of ball 378 in housing 380. Passageway 1046 terminates internally of stem 1000 at a T. The ends of the T extend to diametrically opposite openings 1048, 1050 in the surface of stem 1000. Reliefs 1052 with O-ring seals are provided around openings 1048, 1050. Ball 378 is provided with a single passageway 1054. Passageway 1054 extends generally radially of the axis of rotation of ball 378 on stem 1000 to couple either port 332 or port 340 selectively to port 344 provided at the distal end of stem 1000.

Slight clearance between stem 1000 and passageway 1002 above groove 1028 provides solvent conduit for the electrically non-conductive solvent flowing in the space between the inside surface of housing 380 and ball 378 to exit through outlets 302 at the distal end of stem 1000 of the valve 336. The solvent is supplied through ports 300 in housing 380 shown in FIGS. 7 and 8. The solvent extracted through ports 302 is supplied to, for example, a sedimentation filter (not shown) for filtration of coating material therefrom and recycling of the solvent. The solvent supplied through ports 300 fills voids 1060 inside housing 380. In this manner there is continuous circulation of substantially clean solvent all around ball 378 to wash the electrically non-insulative coating residue from the adjacent surfaces of ball 378 and housing 380.

As ball 378 is rotated by actuator 334 between those rest positions, the surface of ball 378 is bathed by the electrically non-conductive solvent rinsing the electrically non-insulative coating material therefrom to minimize electric current conduction from the high-magnitude voltage coating material port 340 to the low-magnitude voltage coating material port 332 and maintain the voltage blocking integrity of valve 336. As ball 378 rotates between its two rest orientations some solvent inevitably will enter passageway 1054 and be dispensed with the coating material when switching is completed. Thus the coating material, the dispenser, and the articles to be coated must be able to tolerate small quantities of the solvent.

In another valve 1336 constructed according to the invention (FIG. 9), a housing 1380 movably supports and houses a generally spherical ball 1378. Ball 1378 is mounted upon a generally right circular cylindrical bearing stem 1100 which extends through a generally right circular cylindrical bore 1102 provided therefor. Seal retainers 1104, 1106 are threaded into the housing 1380. The valve seal retainers 1104, 1106 provide ports 332, 340, respectively. The retainers 1104, 1106 are provided with reliefs 1110 in their facing surfaces 1112, 1114. Reliefs 1110 house valve seals 1116. Grooves 1120, 1122 with O-ring seals are provided between the adjacent surfaces of seals 1116 and retainers 1104, 1106.

Stem 1100 is provided with a passageway 1146 which extends generally along the axis of rotation of ball 1378 in housing 1380. Passageway 1146 terminates internally of stem 1100 at a T. The ends of the T extend to diametrically opposite openings 1148, 1150 in the surface of stem 1100. Reliefs 1152 are provided around openings 1148, 1150. Seal inserts 1153 are provided with backing resilient O-rings to urge the seal inserts 1153 outward against a central socket 1142 formed in ball 1378 to receive the upper end of stem 1100. Ball 1378 is provided with a single passageway 1154. Passageway 1154 extends generally radially of the axis of rotation of ball 1378 on stem 1100 to couple either port 332 or port 340 selectively to port 344 (not shown in FIG. 9) provided at the distal end of stem 1100.

Electrically non-conductive solvent is supplied through ports 300 in housing 1380 and extracted through ports 302 in housing 1380 from which it is supplied to, for example, a sedimentation filter (FIGS. 10a–b–11) for filtering out coating material therefrom and recycling of the solvent. The solvent supplied through ports 300 flows radially inwardly toward the surface of ball 1378 at relatively high velocity through narrow annular grooves 1162 provided in the seal retainers 1104, 1106. The electrically non-conductive solvent is directed against the coating material-bearing surfaces of ball 1378 as ball 1378 rotates between its positions. In this manner there is continuous circulation of substantially clean solvent all around ball 1378 to wash the electrically non-insulative coating residue from its surface and inside surface of housing 1380 to maintain the voltage blocking integrity of valve 1336.

As ball 1378 rotates between its rest orientations some solvent inevitably will enter passageway 1154. Thus the coating material, the dispenser, and the articles to be coated again must be able to tolerate small quantities of the solvent.

Because voltage is to be blocked by the valve 36, 136, 236, 336, 436, 536, 636, 736, 836, 936, 1336 components and associated fittings, and fixtures such as the fluid conduits, cylinder reservoirs 52, 152, 252, 352, 452, pistons 54, 154, 254, 354, 454, 554, 654, 854, 954 and the like, these must be constructed from suitably electrically non-conductive materials. By way of example only, and not by way of limitation, the valve housings, valve balls, other movable valve components, cylinder reservoirs and pistons can be constructed from Delrin® acetal resin, although Nylon and Teflon® polytetrafluoroethylene (PTFE) are also suitable. Delrin® resin was chosen for its good mechanical strength, resistance to solvents, temperature resistance, which is a consideration if heated coating materials are being dispensed, and good, that is, electrically non-conductive, electrical characteristics. The ball valve seats 1016, 1018, 1116 illustratively are constructed from PTFE, although semiconductive materials, such as Thermocomp FP-EC 1004 resin available from LNP Engineering Plastics, Inc., 475 Creamery Way, Exton, Pa. 19341 also can be used. The use of semiconductive materials for these seats helps to distribute the electrical energy at the contact area between the seats 1016, 1018, 1116 and the valve ball 378, 1378 preventing arcing across the contact area between the ball and the seat. Such arcing can result in ball burning and voltage blocking degradation. The static O-ring seals illustratively are constructed from Viton® synthetic rubber. The dynamic O-ring seals illustratively are constructed from Kalrez® synthetic rubber.

Figure 10A:
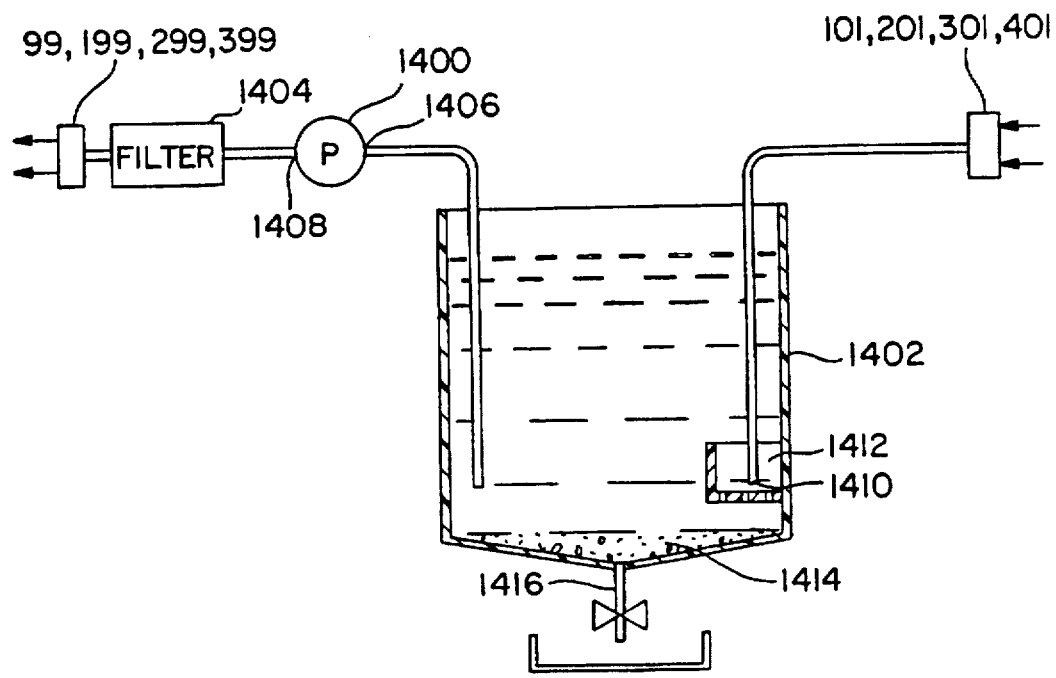

Referring to FIG. 10a, a solvent circulation system for use with the systems illustrated in FIGS. 1–5 illustratively includes a diaphragm pump 1400, solvent inlet 99, 199, 299, 399 and outlet 101, 201, 301, 401 manifolds, a reservoir 1402 having a capacity of, for example, 3–5 gallons (about 11.4—about 18.9 liters), for a supply of solvent and a cartridge filter 1404 on the inlet 1406 or outlet 1408 (outlet is presently preferred) of the diaphragm pump 1400. The pump 1400 withdraws solvent from the top of the reservoir 1402, pumps the withdrawn solvent through the filter 1404 to remove solids entrained in it, through the inlet manifold 99, 199, 299, 399 to the several connections 100, 200, 300, 400, 500 on the valve housing 80, 180, 280, 380, 480, 580, 680, 780, 880, 980, 1380, to the several connections 102, 202, 302, 402, the outlet manifold 101, 201, 301, 401 and thence back to the inlet 1410 to the reservoir 1402. The reservoir 1402 contains a screen 1412 in its return which reduces velocity and turbulence, permitting sedimentation of solids 1414 from the returning solvent stream into the bottom of the reservoir 1402. A drain 1416 on the bottom of the reservoir 1402 permits periodic removal of the precipitated coating material solids 1414.

Figure 10B:
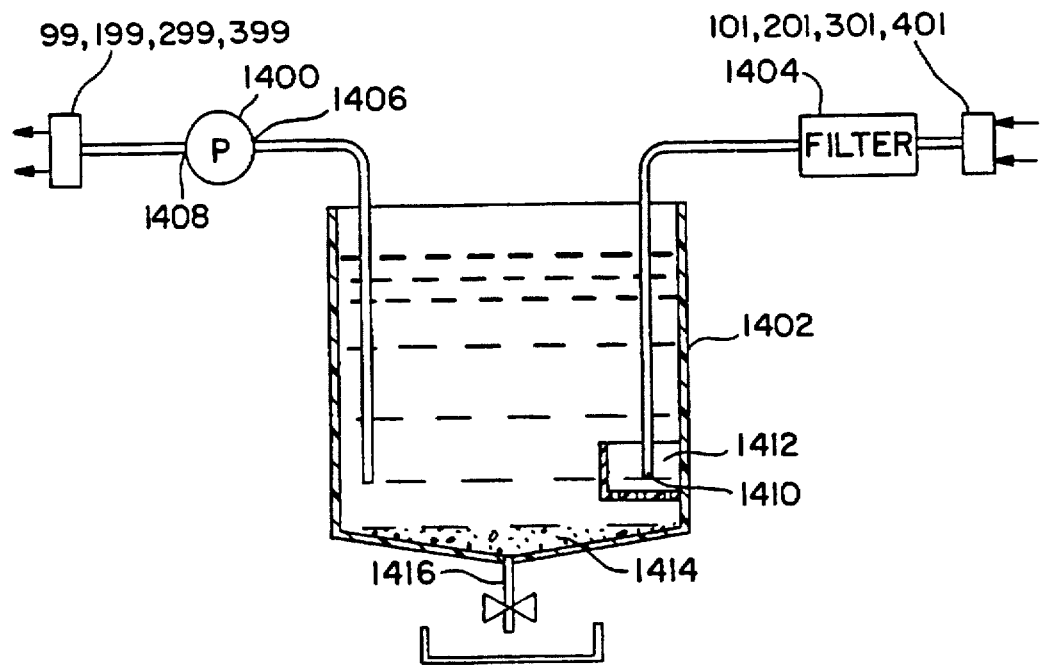

Referring to FIG. 10b, a solvent circulation system for use with the systems illustrated in FIGS. 1–5 illustratively includes a diaphragm pump 1400, solvent inlet 99, 199, 299, 399 and outlet 101, 201, 301, 401 manifolds, a reservoir 1402 having a capacity of, for example, 3–5 gallons (about 11.4—about 18.9 liters), for a supply of solvent and a cartridge filter 1404 on the inlet 1410 to reservoir 1402. The pump 1400 withdraws solvent from the top of the reservoir 1402, pumps the withdrawn solvent through the inlet manifold 99, 199, 299, 399 to the several connections 100, 200, 300, 400 on the valve housing 80, 180, 280, 380, 480, 580, 680, 780, 880, 980, 1380, to the several connections 102, 202, 302, 402, the outlet manifold 101, 201, 301, 401 and a filter 1404 to remove solids entrained in the solvent and thence back to the inlet 1410 to the reservoir 1402. Filter 1404 is renewable by any suitable technique. For example, filter 1404 can have a disposable cartridge, or a cartridge which can be cleaned to remove coating material residue trapped in it. The reservoir 1402 contains a screen 1412 in its return which reduces velocity and turbulence, permitting sedimentation of solids 1414 from the returning solvent stream into the bottom of the reservoir 1402. A drain 1416 on the bottom of the reservoir 1402 permits periodic removal of the precipitated coating material solids 1414.

Figure 11:
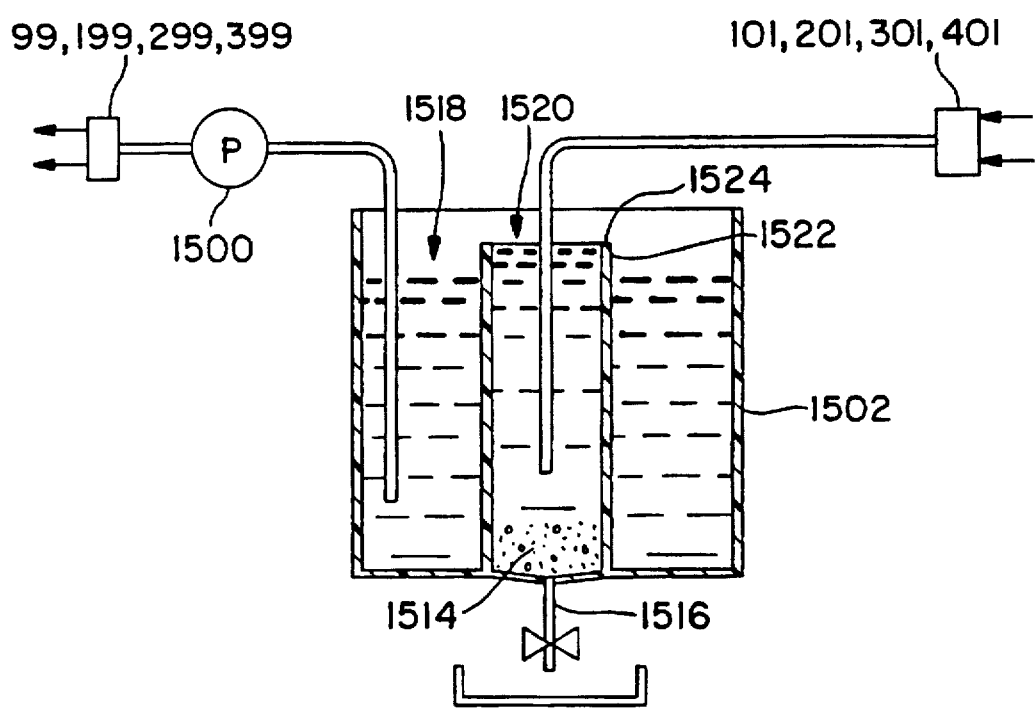

Another filtration system according to the invention is illustrated in FIG. 11. This system employs a reservoir 1502 having supply 1518 and return 1520 compartments separated by a barrier 1522 over the top 1524 of which solvent is permitted to seep. The solvent supply and return circuits and both compartments 1518, 1520 are initially filled to the height of the barrier 1522. As a pump 1500 withdraws solvent from the supply compartment 1518 and returns it to the return compartment 1520, its velocity and turbulence are reduced sufficiently as it reenters the return compartment 1520 that solids 1514 borne by the solvent stream settle out in the return compartment 1520 and can be drained from the return compartment 1520 periodically through a drain 1516 provided in the bottom of the return compartment 1520.

If the velocity of the flushing solvent against the ball 78, 178, 278, 378, 478, 578, 678, 778, 878, 978, 1378 is sufficiently high owing to the design of the valve 36, 136, 236, 336, 436, 536, 636, 736, 836, 936, the solvent chemistry may not be too great a concern if the solvent is sufficiently electrically non-conductive (100 Ω-cm or greater). The velocity of the solvent may be sufficiently great to remove coating material residue from the surfaces of the valve ball and housing without the coating material actually being particularly soluble in the solvent. Under such circumstances the coating material would not disperse in the solvent and the filter 1404 and reservoir may be able to capture substantially all of the coating material, resulting in longer service life of the solvent. However, in those situations in which the valve design and fluid dynamics of the valve and solvent are not such that the solvent velocity alone will strip the coating material residue from the surfaces of the valve, the chemistry of the flushing solvent must be considered.

The flushing solvent dissolves the coating material film from surface of the ball 78, 178, 278, 378, 478, 578, 676, 778, 878, 978 and 1378 and removes coating material residue from the ball vicinity, isolates the high-magnitude voltage ports 40, 140, 240, 340, 440, 540, 640, 740, 840, 940 from the low-magnitude voltage ports 32, 132, 232, 332, 432, 532, 632, 732, 832, 932, minimizing the amount of current that flows between these ports inside the valve 36, 136, 236, 336, 436, 536, 636, 736, 836, 936, 1336. The solvent thus must have high bulk electrical resistivity ($\geq 100$ Ω-cm) to act as an insulative medium inside the valve 36, 136, 236, 336, 436, 536, 636, 736, 836, 936, 1336 to minimize the current between port 32, 132, 232, 332, 432, 532, 632, 732, 832, 932 which is coupled to ground, and port 40, 140, 240, 340, 440, 540, 640, 740, 840, 940 which is coupled to high voltage. Arcing between the high-magnitude voltage port 40, 140, 240, 340, 440, 540, 640, 740, 840, 940 and the low-magnitude voltage port 32, 132, 232, 332, 432, 532, 632, 732, 832, 932 is prevented by providing a sufficient separation distance between these ports at the same time the solvent which is filling the space between these ports must have a high dielectric strength. The dielectric strength should be higher than the voltage difference between the ports divided by the distance separating them.

This poses an optimization problem in determining the proper solvent to achieve good cleaning of coating material film from the surface of the ball 78, 178, 278, 378, 478, 578, 678, 778, 878, 978, 1378 and to minimize leakage current and arcing between port 40, 140, 240, 340, 440, 540, 640, 740, 840, 940 and port 32, 132, 232, 332, 432, 532, 632, 732, 832, 932. A small amount of coating material is transferred to the circulating non-conductive solvent when the valve 36, 136, 236, 336, 436, 536, 636, 736, 836, 936, 1336 switches. This small volume of coating material must be quickly removed away from the ball/seat vicinity by the solvent being circulated through the valve 36, 136, 236, 336, 436, 536, 636, 736, 836, 936, 1336 and returned to the solvent reservoir to be filtered out of the circulating solvent. However, solvents which exhibit good cleaning characteristics (rapidly dissolving coating material film from the ball surface) are generally electrically less insulative. Poor electrical insulation of the solvent is, of course, to be avoided because it causes higher current inside of the valve 36, 136, 236, 336, 436, 536, 636, 736, 836, 936, 1336.

A characteristic of a good solvent is that when it is mixed with coating material it would break the coating material in small particles and keep these small particles in suspension. When the solvent is at rest, the small particles tend to settle out of the solvent because of their higher mass density. The coating material solids must break out of suspension and settle fairly readily to the bottom of the solvent reservoir where they can be periodically drained, thus minimizing the contamination of the solvent that inevitably will occur over several hundred switchings of the valve 36, 136, 236, 336, 436, 536, 636, 736, 836, 936, 1336. However, the solvent must be able to wash the coating material from the valve housing and ball surfaces. Therefore, the solvent must meet three criteria. It must have: (1) adequate cleaning power to wash away the coating material residue from the vicinity of the ball 78, 178, 278, 378, 478, 578, 678, 878, 978, 1378 and seat 1016, 1018, 1116 quickly; (2) relatively high electrical bulk resistivity (>100 Ω-cm) to minimize current inside the valve 36, 136, 236, 336, 436, 536, 636, 736, 836, 936, 1336; and (3) minimum ability to suspend the coating material indefinitely in a quiescent state to avoid to the extent possible a too-rapid reduction in the solvent electrical resistivity.

Figure 12C:
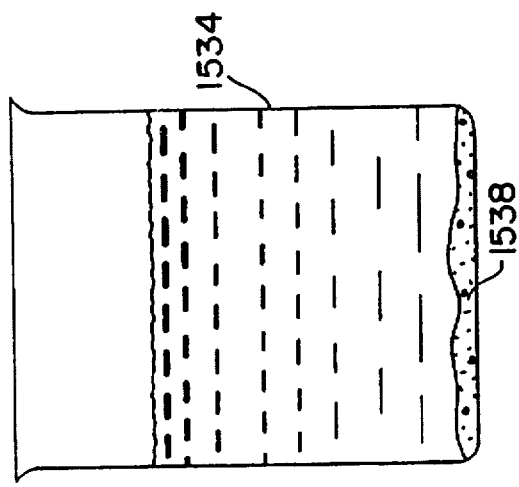
Figure 12B:
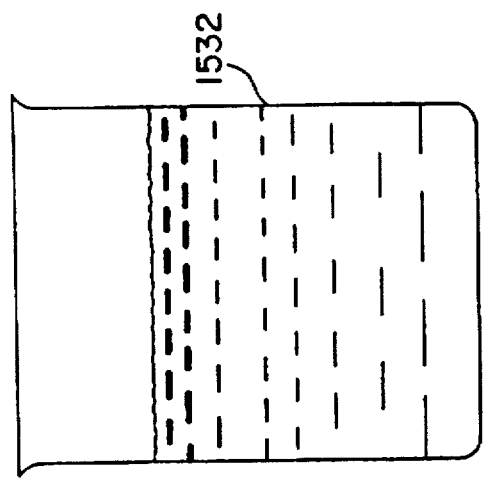
Figure 12A:
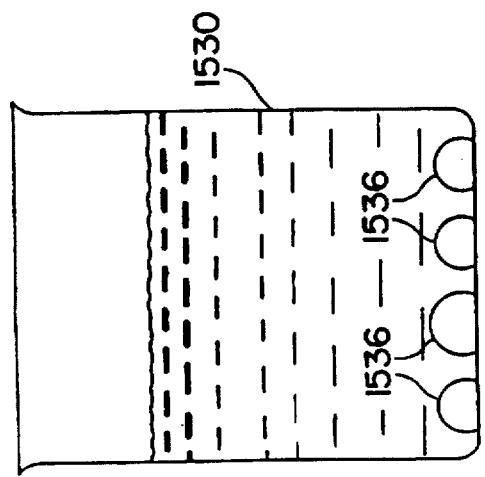

A bench experiment can determine the proper solvent for a particular coating material formulation. An example of this experiment is illustrated in FIGS. 12*a–c*. FIGS. 12*a–c* illustrate three beakers 1530, 1532, 1534 containing solvents. A sample of the particular coating material that will be used in the voltage block is pipetted and several drops are placed into each beaker of solvent to be tested. The results illustrate how the coating material reacts in different solvents.

Droplets 1536 of the coating to be tested (here, bright white DWB 9753 manufactured by PPG coatings) are introduced into the first beaker 1530 containing an aromatic solvent, illustratively xylene or toluene. The coating material droplets 1536 remain intact and practically do not mix at all with the solvent. This indicates poor cleaning capability. The aromatic solvent in beaker 1530 thus meets the second and third criteria discussed above, but does not meet the first. When the coating material droplets are introduced into the second beaker 1532 containing a more electrically conductive solvent (illustratively, an alcohol, a ketone or an acetate), the droplets are immediately suspended or dissolved. The active solvent in beaker 1532 thus meets the first criterion, but not the second and third criteria. When the coating droplets are introduced into the third beaker 1534 containing a blend of aromatic and active solvents, optimization is achieved. Illustratively, the solvent in beaker 1536 is 80% xylene and 20% n-butyl alcohol. The mixture in beaker 1534 is somewhat cloudy or murky, but coating material solids precipitate 1538 is apparent at the bottom of the beaker 1534. The solvent's cleaning capability is adequate to remove the coating material residue from the area of the ball 78, 178, 278, 378, 478, 578, 678, 778, 878, 978, 1378 and seat 1016, 1018, 1116 quickly, and yet the solvent has adequate bulk electrical resistivity, and the solubility of the coating material in the solvent is low enough to cause at least a majority of the coating material solids to settle out of suspension fairly quickly once the suspension reaches the quiescent zone of the solvent reservoir.

At the start the circulating non-conductive solvent resistivity is typically high (>100 Ω-cm). As valve 36, 136, 236, 336, 436, 536, 636, 736, 836, 936, 1336 is switched more non-insulative coating material will be added to the circulating non-conductive solvent resulting in reduction in the resistivity of this solvent. At some point the solvent will be too conductive (resistivity ≈1MΩ-cm) for voltage blocking. At such a point the solvent has to be replaced by a fresh (non-contaminated) solvent. Extending the lifetime of the solvent is important and this is done by the successful valve design minimizing the amount of coating material transfer to the solvent during valve switching and preventing coating material leakage to the solvent at the seats and using an efficient filtration system to filter out from the solvent the solid particles and other conductive fluids added to it as a result of contamination with the coating material.

Figure 13:
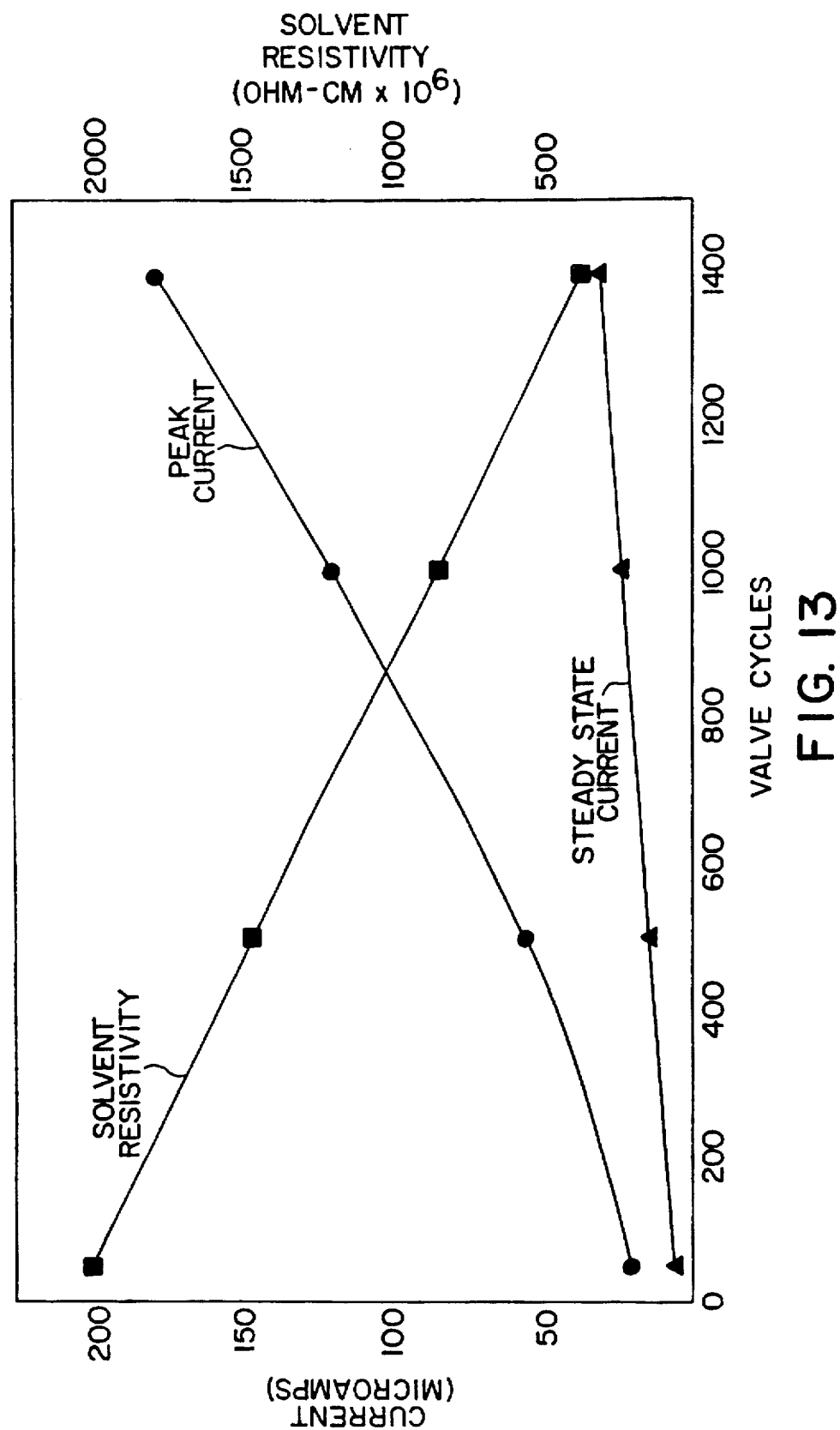

FIG. 13 illustrates a graph of the results of tests conducted using the coating material of FIGS. 12*a–c*. The illustrative solvent was a blend of 80% toluene and 20% n-butyl alcohol, both available from a variety of solvent suppliers. In the tests illustrated in FIG. 13, the coating material supply was at ground potential and the dispenser was at −100 KV DC. The current from the power supply was monitored and recorded during several hundred cycles of the valve 36, 136, 236, 336, 436, 536, 636, 736, 836, 936, 1336. The steady state current is the current that flows between switchings of the valve 36, 136, 236, 336, 436, 536, 636, 736, 836, 936, 1336. The peak current is the current that flows momentarily as the valve 36, 136, 236, 336, 436, 536, 636, 736, 836, 936, 1336 switches. It is important to keep the steady state current as low as possible to maintain a high potential on the dispensing device during the dispensing operation. It is equally important to minimize the peak current (both magnitude and duration) to reduce the possibility of arcing across the surfaces of the ball 78, 178, 278, 378, 478, 578, 678, 778, 878, 978, 1378 or seat 1016, 1018, 1116 which might otherwise ultimately result in mechanical failure of the adjacent sealing surfaces of these.

Also during the test, the solvent's bulk electrical resistivity was monitored using, for example, an ITW Ransburg Model 70408 paint resistance meter available from ITW Ransburg, 320 Phillips Avenue, Toledo, Ohio 43612. The electrical resistivity of the solvent slowly declined over several hundred cycles of the valve 36, 136, 236, 336, 436, 536, 636, 736, 836, 936, 1336 as more and more of the coating material vehicle (here, water) mixed with the solvent, and more and more of the coating material solids became suspended in the solvent. However, in a typical electrostatic coating operation using a voltage block of this type, approximately 500 switchings would occur during a production shift. At the end of the shift, the coating material precipitate and a portion of the solvent would be removed and fresh solvent added to replenish the supply. The filter used to help strip the coating material solids from the solvent would be removed, rinsed in an appropriate solvent and reused, or replaced. The daily operational costs for the replacement of the solvent would only be a few dollars.

This test can be easily adapted for use with a variety of types of coatings such as emulsions, dispersions and solutions containing a variety of resin structures in a variety of vehicles to meet the particular requirements of a particular coating operation.

The described methods and apparatus are not limited to use with waterbase coatings only, but can also be used with other highly conductive or semi-conductive coating material vehicle formulations or coatings containing pigments, such as metallics, which are electrically highly conductive. The solvent compatibility test described herein can be applied to these other types of conductive coating formulations as well.

In another embodiment according to the invention illustrated in FIGS. 14–17, a somewhat right circular cylindrical, or drum-shaped, four way valve body 1550 is rotatably housed in a valve housing 1552 having a generally right circular cylindrical interior 1554. The housing 1552 includes a sidewall portion 1556 and two endwall portions 1558, 1560. A square transverse section drive shaft 1562 extends through a complementarily configured passageway 1564 provided therefor in body 1550. The circular cross section ends of drive shaft 1562 are rotatably mounted in endwall portions 1558, 1560 by suitable bearings 1565. Sidewall 1556 is provided with four equally circumferentially spaced coating material ports 1566, 1568, 1570, 1572, all of which are similarly configured, and so only one of which will be discussed in detail.

Port 1566 is defined by a seal 1574, a seal retainer 1576 and a retainer housing 1578. The inner, concave, surface 1584 of seal 1574 which physically lies against the outer surface of valve body 1550 in its central region 1586 is a surface of a sphere having a radius equal to the distance from the geometric center of shaft 1562 perpendicularly outward from the axis 1587 of shaft 1562 to the inner surface of sidewall 1556. The outer surface of the central region 1586 of valve body 1550 also is a surface of a sphere having the same radius and centered at the midpoint of the length of axis 1587. This is done to facilitate assembly of the valve 1588. This configuration also provides a valve seal 1574, 1584, 1586 which is effectively self-lapping. That is, the seal 1574, 1584, 1586 efficiency is not degraded through use, and may, in fact, even improve through operating cycles of the valve 1588.

Figure 14:
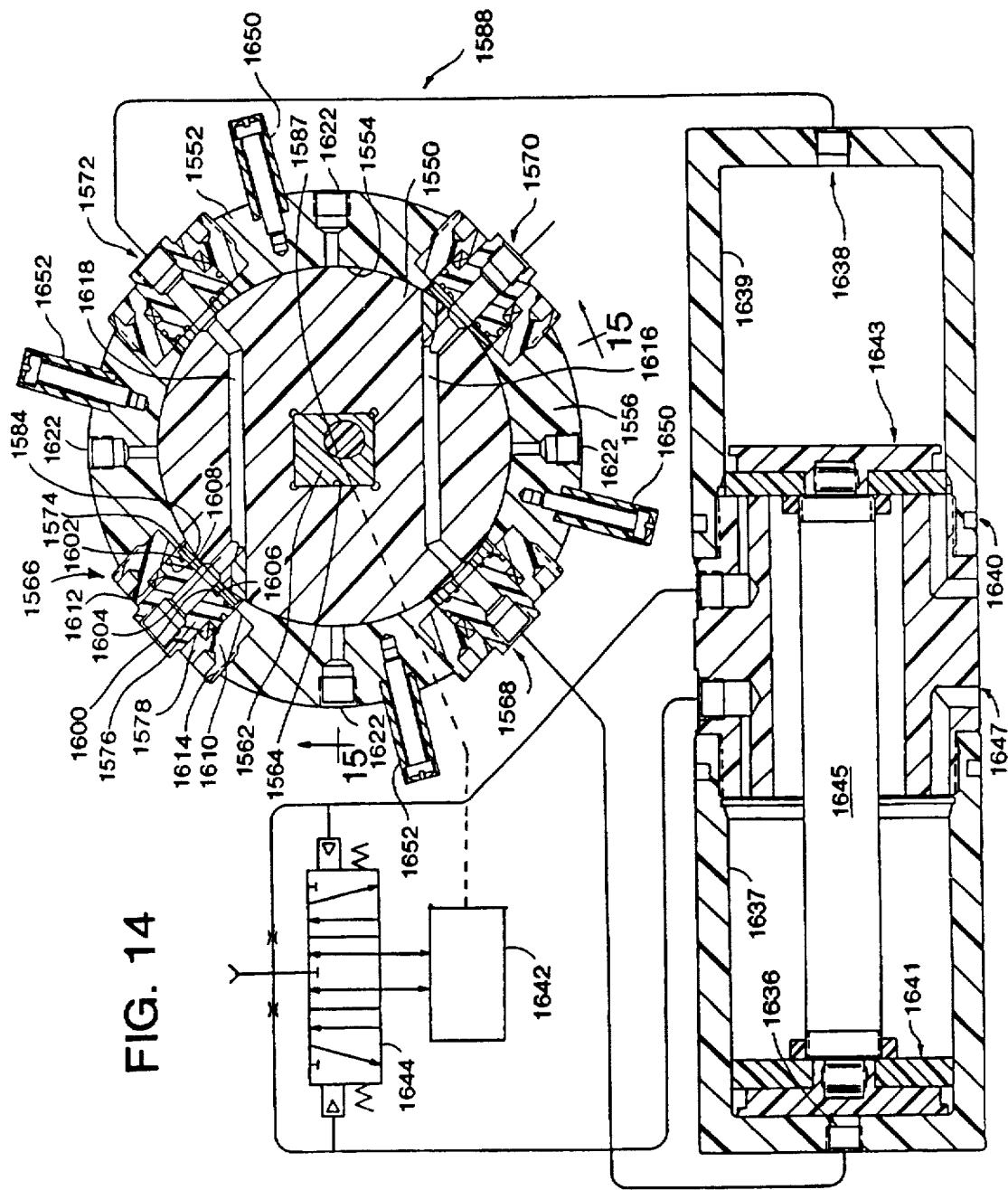
Figure 14C:
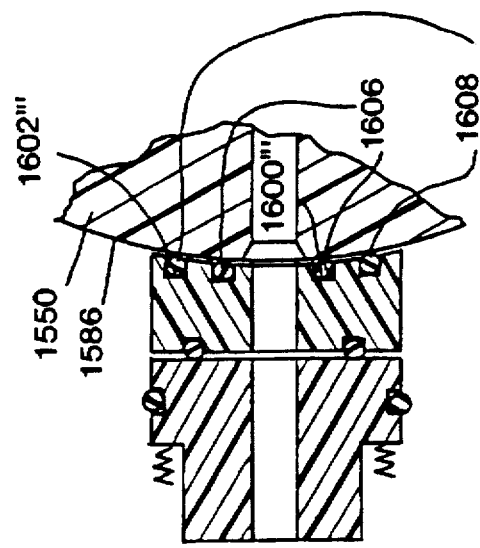
Figure 14B:
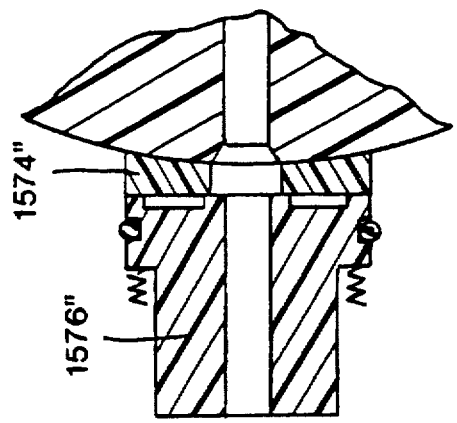
Figure 14A:
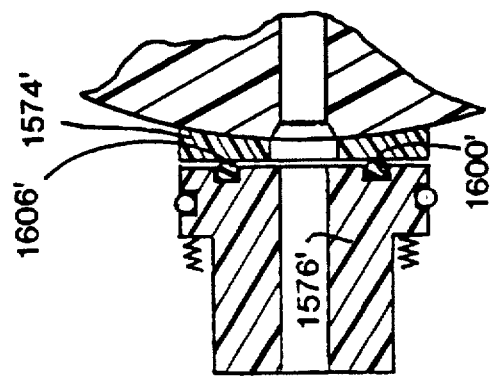

Other embodiments of the seal, seal retainer and retainer housing are illustrated in FIGS. 14a–c. In FIG. 14a, a single O-ring 1606' in a groove 1600' is provided between the seal 1574' and seal retainer 1576'. In FIG. 14b, the surface of seal retainer 1576" facing the backside of seal 1574" is provided with a rectangular cross-section annular void, so that the loading on seal 1574" is at its center and around its circumference. In the embodiment illustrated in FIG. 14c, the O-ring seals 1606'" and 1608'" are provided in grooves 1600'", 1602'", respectively to bear directly against the central region 1586 of valve body 1550.

Central region 1586 merges beyond surface 1584 of seal 1574 at grooves 1585 and 1587 into substantially right circular cylindrical end regions 1590 of valve body 1550. An annular groove 1592 is provided between cooperating surfaces of sidewall portion 1556 and each of endwall portions 1558, 1560. An annular seal 1594 comprising, for example, an ultra high molecular weight (UHMW), high density polyethylene (HDPE) jacket 1596 of generally U-shape transverse to its circumferential extent, and a circular cross-section Viton® O-ring 1598 for holding the jacket 1596 in its fully open or spread configuration, is housed in each groove 1592. Seals of this configuration are available from, for example, Bal Seal Engineering Company, Inc., 620 West Warner Avenue, Santa Ana, Calif. 92707-3398.

Seal retainer 1576 is provided with two grooves 1600, 1602 concentric with the opening 1604 of port 1566. An O-ring 1606, 1608 is provided in each of grooves 1600, 1602, respectively, to bear against the back surface of seal 1574 to seal the port 1566 from the space radially outwardly beyond O-rings 1606, 1608. Seal retainer 1576 is slidably received in retainer housing 1578. A wave spring 1610 is positioned in an annular space 1612 provided between retainer 1576 and housing 1578 to urge seal 1574 into intimate sealing contact with the central region 1586 of valve body 1550. Wave springs 1610 illustratively are constructed from stainless steel and are available from, for example, Smalley Steel Ring Company, 385 Gilman Avenue, Wheeling, Ill. 60090. Retainer housing 1578 is threaded into an opening 1614 provided therefor in sidewall 1556.

Passageways 1616, 1618 are provided in valve body 1550 selectively to connect circumferentially adjacent ports 1566, 1568 and 1570, 1572 or 1566, 1572 and 1568, 1570. Valve body 1550, sidewall portion 1556, endwall portions 1558, 1560, seal 1574, seal retainer 1576 and housing 1578 can all be constructed from Delrins resin or the like, although polyetheretherketone (PEEK) or Torlon® resin or the like may be more suitable for more highly abrasive coating materials, such as mica-based coating materials and the like.

Solvent/voltage blocking medium inlet 1620 and outlet 1622 port pairs are provided in sidewall portion 1556. Circumferentially of sidewall portion 1556, the port pairs 1620, 1622 are equidistantly spaced between adjacent coating material ports 1566, 1568, 1570, 1572. However, axially of sidewall portion 1556, ports 1620 are offset toward endwall portion 1558 and ports 1622 are offset toward endwall portion 1560. The ports 1620, 1622 open into the interior 1554 of housing 1552 at the locations of grooves 1585, 1587 on valve body 1550. This configuration permits the solvent/voltage blocking medium to wash continuously across the region 1586 between ports 1620 and 1622 and flush away any coating material residue on the surface of region 1586 as the valve 1588 operates.

Port 1566 is coupled to a suitable grounded source 1626 of coating material, such as a source of one of the types previously described. Port 1570 is coupled to a suitable coating material dispenser 1628, such as a coating material dispenser of one of the types previously described.

The two input-output ports 1568, 1572 of valve 1588 are coupled to the two input/output ports 1636, 1638, respectively, of a double acting cylinder reservoir 1640 of the general type previously discussed. Although not shown, the cylindrical walls of 1637, 1639 of the reservoirs under ports 1636, 1638, respectively, can be lined with, for example, stainless steel sleeves to improve wear resistance. The sleeves are, of course, electrically isolated from each other by the materials from which the pistons 1641, 1643, piston rod 1645, and center section 1647 of the reservoir 1640 are constructed. A rotary actuator 1642 coupled to shaft 1562 is actuated to drive valve body 1550 between its position (not shown) coupling ports 1566, 1568 through passageway 1616 and ports 1572, 1570 through passageway 1618 and its position (shown) coupling ports 1566, 1572 through passageway 1618 and ports 1568, 1570 through passageway 1616. Actuator 1642 illustratively is a Turn-Act® rotary vane pneumatic actuator available from Isaacs Fluid Power Equipment Company, 8746 East 33rd Street, Indianapolis, Ind. 46226. Actuator 1642 is controlled by a three position, center-exhaust valve 1644 such as, for example, the type 180304-612-0304 valve available from MAC Valves, Inc., P.O. Box 111, 30569 Beck Road, Wixom, Mich. 48393-7011. A center exhaust valve of this type permits the actuator to be emptied of drive air at the end of each quarter turn rotation of valve body 1550. This substantially increases the speed with which the valve 1588 operates to switch between its two positions just discussed. This increased speed of operation translates into a lower current pulse peak and a narrower current pulse width of the current pulse flowing between the high magnitude potential supply 1646 coupled to the coating material dispenser 1628 and ground through valve 1588.

As best illustrated in FIG. 14, corona shields 1650 which extend, for example, the full height of sidewall portion 1556, optionally can be provided on the outside surface of sidewall portion 1556 to increase the distance across this surface between port 1570 which is maintained by supply 1646 more or less continuously at high magnitude electrostatic potential and the adjacent ports 1568 and 1572 which are alternately switched to about ground potential by the operation of valve 1588. Similarly, corona shields 1652 can be provided between ports 1568 and 1572 which are alternately switched to high magnitude electrostatic potential by the operation of valve 1588 and port 1566 which is maintained more or less continuously at about ground potential.

Figure 15:
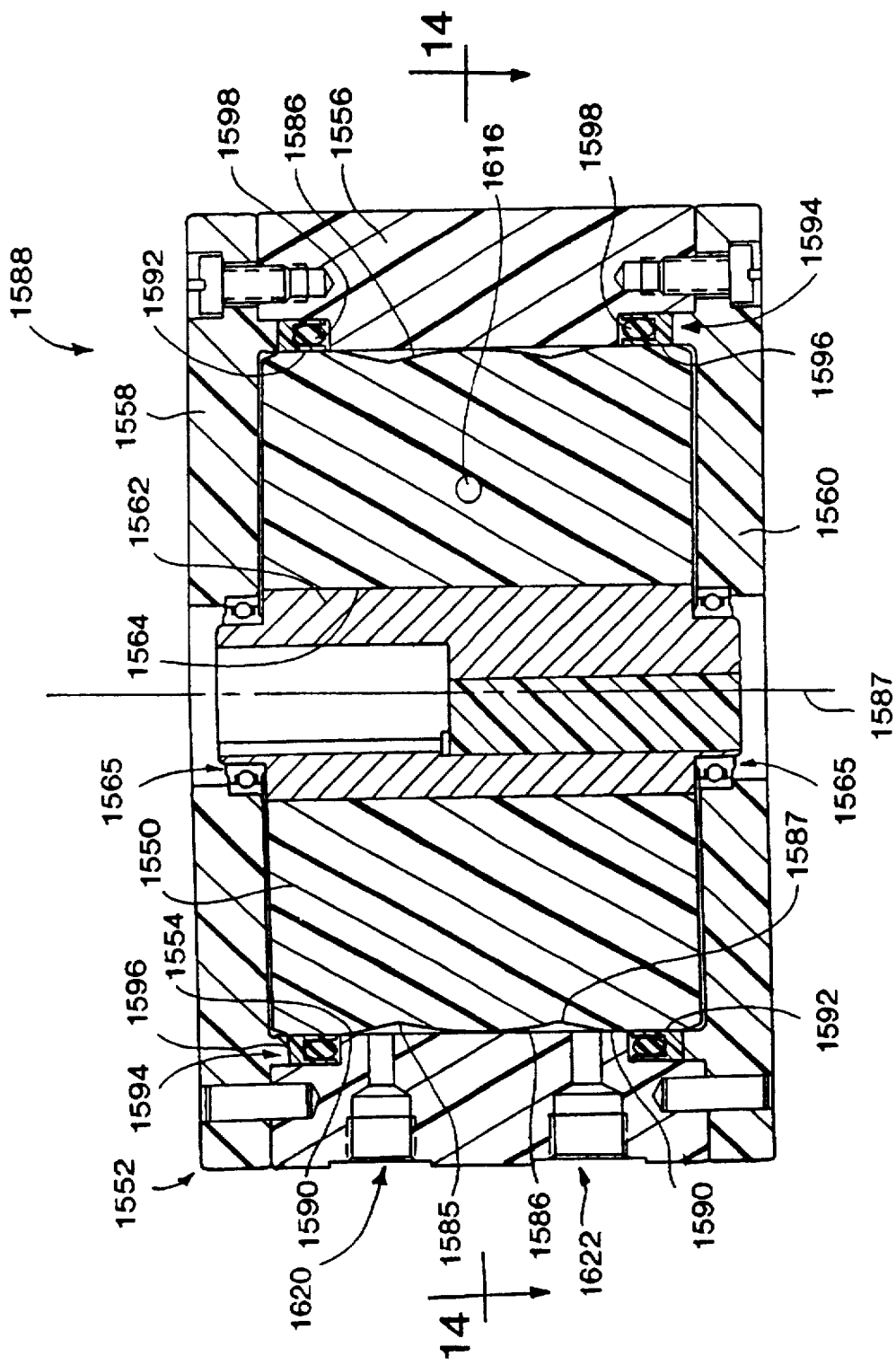
Figure 15A:
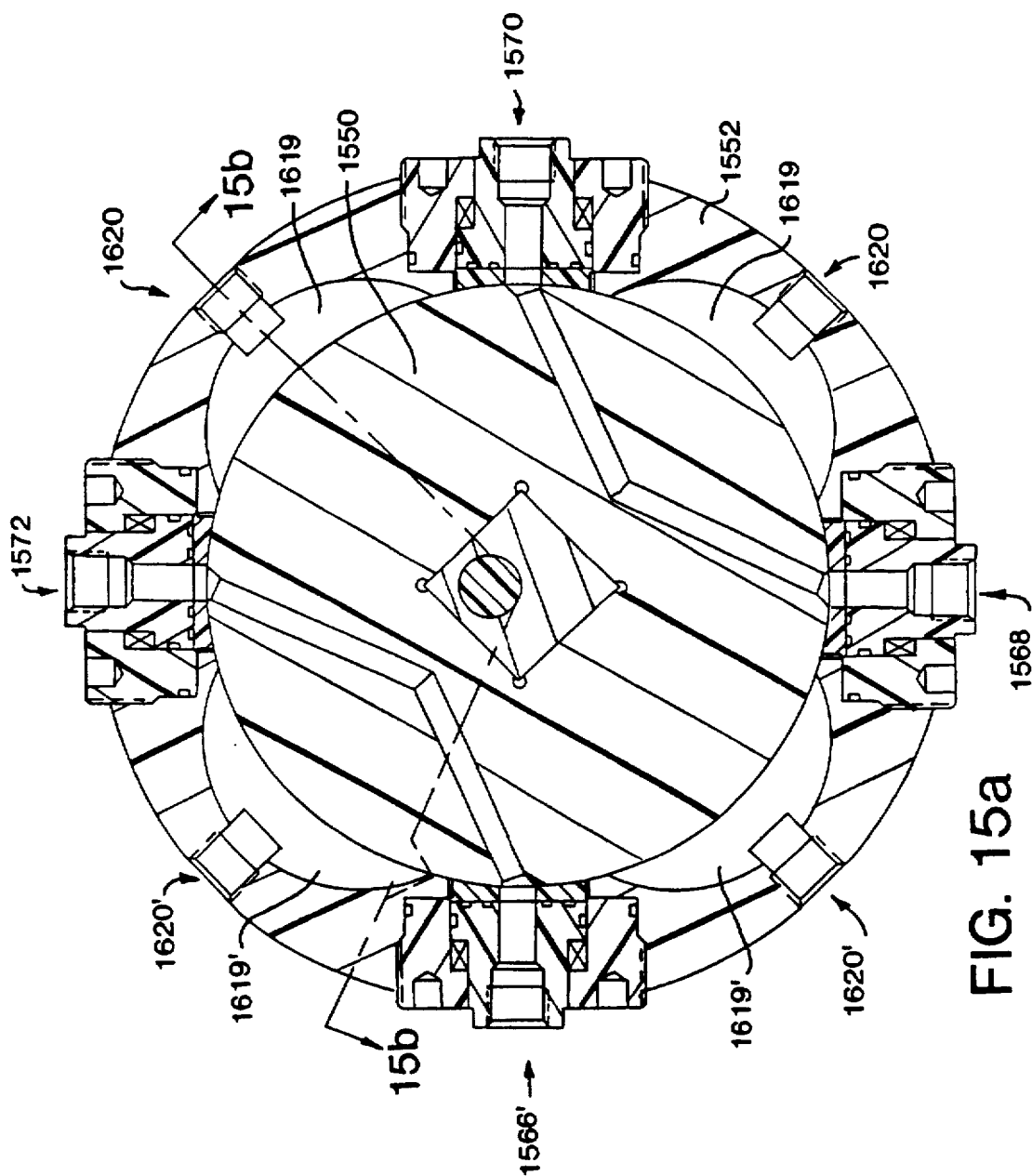
Figure 15B:
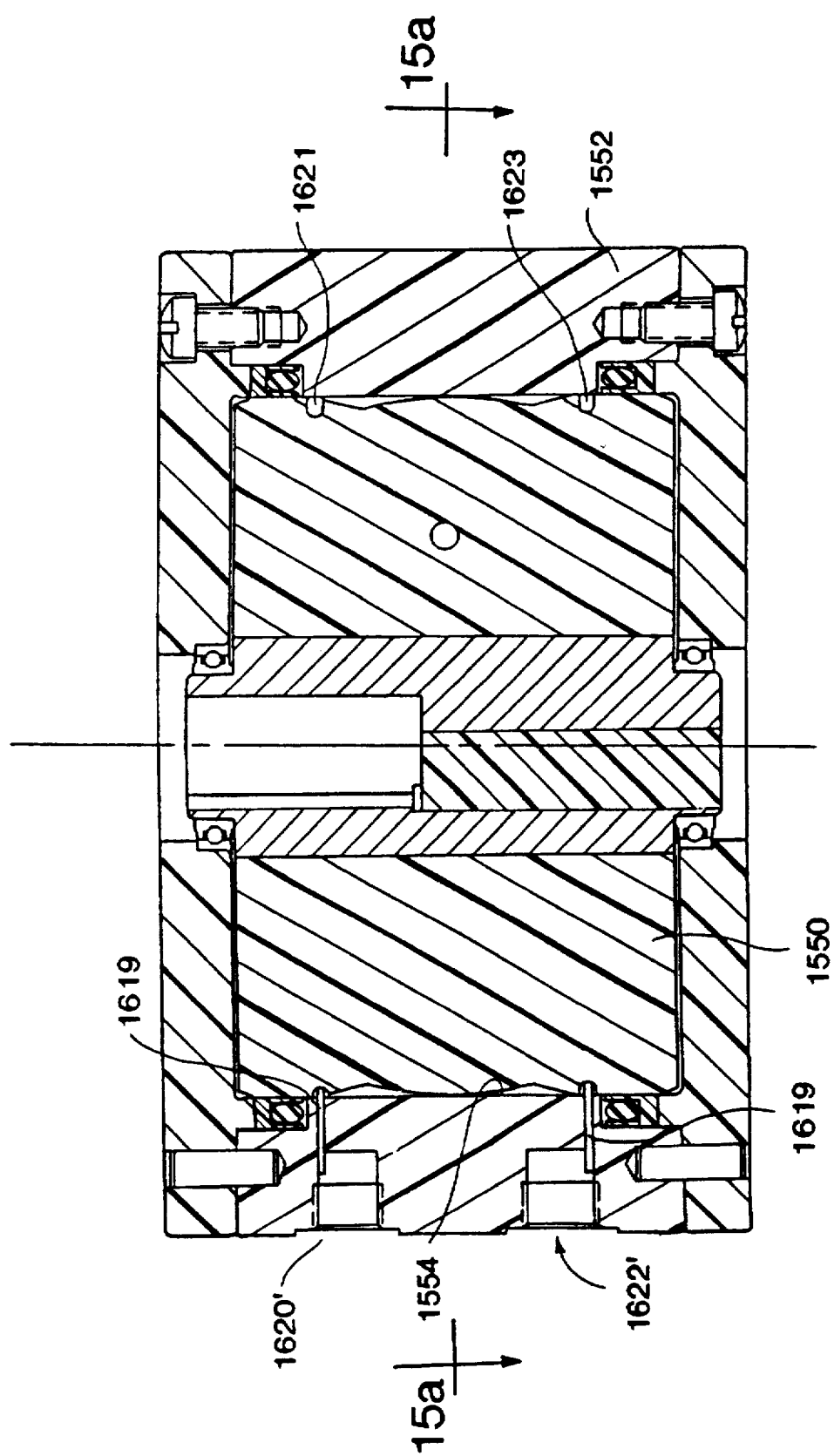

In another embodiment of the valve illustrated in FIGS. 15a–b, the four way valve body 1550' is rotatably mounted in a valve housing 1552' having a generally right circular cylindrical interior 1554'. In this embodiment, the solvent/blocking medium inlet ports 1620 and solvent/blocking medium outlet ports 1622 of the FIGS. 14–15 embodiment are replaced by the somewhat differently configured solvent/blocking medium inlet ports 1620' and solvent/blocking medium outlet ports 1622'. The radially inner extents of ports 1620' and 1622' are configured as narrow height, for example, about 0.057 inch (about 1.4 mm), 1.25 inch (about 3.2 cm) radius arcurate galleries 1619' which intersect with generally circular cross section threaded outer portions of the ports 1620', 1622'. This configuration better distributes the solvent/blocking medium around the valve interior, reduces the likelihood of accumulation of coating material on certain valve surfaces, and promotes better cleaning. To further enhance the distribution of the solvent/blocking medium around the valve interior, two circumferentially extending grooves 1621', 1623' are provided in the valve body 1550'. One, 1621', of the grooves is provided on one side of the coating material entry and exit ports 1566', 1568', 1570' and 1572'. The other, 1623', of the grooves is provided on the other side of the coating material entry and exit ports 1566', 1568', 1570' and 1572'. The slot shaped radially inner terminations of the solvent/blocking medium inlet and outlet ports 1620', 1622' combine with the circumferential grooves 1621', 1623' to provide a plenum for the solvent/blocking medium to be distributed around the entire valve body 1550'. Since the gap between the valve body 1550' and valve housing 1552' elsewhere is minimal, the solvent/blocking medium is supplied fairly uniformly about the valve body 1550' at fairly uniform, uniformly higher velocity. Better scavenging of the coating material residue from the valve body 1550' and valve housing 1552' surfaces results.

Figure 16:
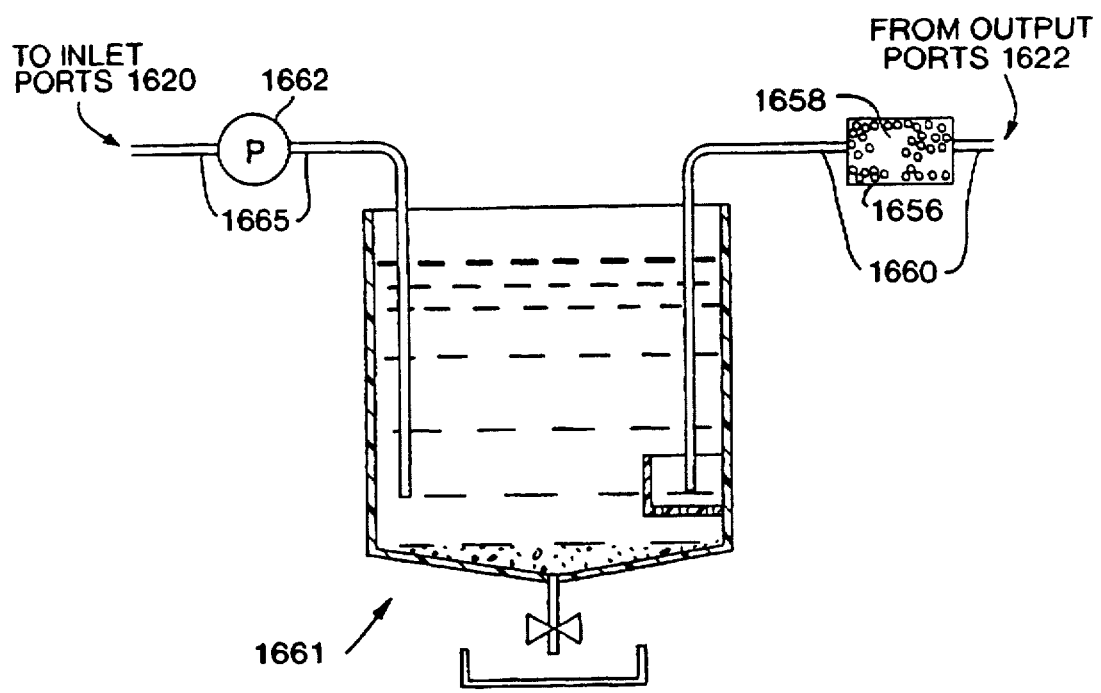
FIG. 16 illustrates, partly schematically, a portion of a solvent/voltage blocking medium supply and return circuit for the valve of FIGS. 14–15.

A solvent/voltage blocking medium supply and return circuit for the system of FIGS. 14–15 is illustrated in FIG. 16. In the system illustrated in FIG. 16, a container 1656 packed with molecular sieves 1658 is located in a line 1660 leading from solvent/blocking medium outlet ports 1622. The molecular sieves 1658 illustratively comprise 8-to-12 mesh (about 0.06 inch—16 mm diameter) beads of crystalline metal aluminosilicates or the like from which the natural water of hydration has been removed by heating to render them capable of selectively adsorbing molecules of a particular size, such as, for example, 3 Angstroms(A), 4A, 5A and so on. Molecular sieves of this type are available from, for example, Aldrich Chemical Co., Inc., P.O. Box 355, Milwaukee, Wis. 53201. These molecular sieves 1658 are useful to dry the water which, it must be remembered, is the typical vehicle for the environmentally friendly coating materials being used that renders these coating materials electrically highly conductive and necessitates the voltage blocking system of the present invention in the first place. The water being thus substantially removed from the solvent/voltage blocking medium of the invention, the solvent/voltage blocking medium is then returned to a reservoir 1661 of the general type described in FIGS. 10a–b, and 11 for subsequent withdrawal by a pump 1662 and supply to the solvent/blocking medium inlet ports 1620 of valve 1588.

In operation of the system of FIGS. 14–17, let it be assumed that the system components are in the positions illustrated in FIG. 14, and that the reservoir coupled to port 1638 is full of electrically conductive coating material. Valve 1644 is actuated by the positions of the pistons in double-acting, piston-and-cylinder reservoir 1640 to cause actuator 1642 to rotate valve member 1550 to its position not illustrated in FIG. 14. In this position, port 1638 is coupled through port 1572, passageway 1618, and port 1570 to dispensing device 1628. Dispensing device 1628 is at high magnitude negative potential with respect to ground, but current flow from device 1628 to ground through the electrically conductive coating material being supplied to device 1628 is effectively blocked by the electrical isolation and electrically insulative character of valve member 1550, valve housing 1556, the double-acting piston-and-cylinder reservoir 1640 and related components of the system. As the connection is made between ports 1638 and 1570, a connection is simultaneously made between ports 1566 and 1568 through passageway 1616. Coating material flow from grounded source 1626 under pressure moves the pistons of FIG. 14 to the left, supplying coating material from the reservoir under port 1638 to the dispensing device 1628. At the same time, the reservoir connected to port 1636 is filled with the electrically conductive coating material. As valve 1644 senses that the reservoir under port 1636 is about full, valve 1644 switches, causing actuator 1642 to return valve member 1550 to its position illustrated in FIG. 14.

The coating material under pressure at port 1566 fills the reservoir under port 1638 through passageway 1618, pushing the pistons of the double-acting piston-and-cylinder of FIG. 14 to the right as it does so. At the same time, the reservoir under port 1636 which is now isolated from ground by the electrically non-conductive construction of valve member 1550, valve housing 1556, the double-acting piston-and-cylinder reservoir 1640 and all of their related components, now begins to transfer the electrically non-insulative coating material through port 1636, passageway 1616 and port 1570 to dispensing device 1628. Once again, although port 1570 is effectively maintained at high-magnitude negative potential with respect to ground by high-magnitude potential source 1646, current flow from source 1646 to ground through the electrically non-insulative coating material between the reservoir under port 1636 and ground is effectively prevented by the electrically non-conductive materials and isolation of valve member 1550, valve housing 1556, the double-acting piston-and-cylinder reservoir 1640 and related components. When the reservoir under port 1636 has emptied, this condition is sensed by valve 1644, and the process begins again. Throughout the coating process just described, solvent/voltage blocking medium flows from reservoir 1661 of FIG. 16 through pump 1662 and conduit 1665 to inlet ports 1620 on valve housing 1556. The solvent/voltage blocking medium flows from ports 1556 through groove 1585, and across the spherical sealing face 1586 of valve member 1550 to groove 1587, picking up the electrically conductive coating material residue on valve member 1550, valve housing 1556 and the associated sealing surfaces of seals 1574 and transporting the coating material residue away. The residue-containing solvent/voltage blocking medium is scavenged by ports 1622 and returned via conduit 1660 and container 1656 to solvent/voltage blocking medium reservoir 1661. As the solvent/voltage blocking medium passes through container 1656, the molecular sieves 1658 adsorb much of the electrically conductive coating material vehicle, for example, water. The coating material solids remaining in the solvent/voltage blocking medium returning to reservoir 1661 effectively settle in the relatively quiescent solvent/voltage blocking medium volume in the lower region of reservoir 1661, leaving more or less unadulterated solvent/ voltage blocking medium to be recycled through pump 1662, conduit 1665 and the remainder of the solvent/voltage blocking medium circuit again.

In this manner, the solvent/blocking medium supplied from ports 1620 continuously washes the surfaces 1584, 1586 of valve 1588 of the electrically highly conductive coating material residue, conveys the residue-bearing solvent/blocking medium stream through ports 1622 and a return line 1663 into contact with the molecular sieves 1658 for removal of the water therefrom, and into the reservoir 1661 where any remaining solids or like foreign matter can settle out of the solvent/blocking medium before it is withdrawn again by the pump 1662 and returned via solvent/ blocking medium supply line 1665 to solvent/blocking medium inlet ports 1620. Additional filtration can be provided as illustrated in FIGS. 10a–b or 11.

Presently preferred solvent/blocking media include a mixture of one part n-butanol and four parts super high flash naphtha (SC100) such as product 11435 available from Unocal Corporation, 1201 West 5th Street, Los Angeles, Calif. 90017 or the like. Other solvent media, such as straight toluene, straight super high flash naphtha, straight n-butanol, straight isopropanol and other mixtures of any two or more of these can also be used. In a typical application, a 500 ml. capacity per end double acting cylinder reservoir 1640 and a valve 1588 system of the type illustrated in FIGS. 14–15 are operated on a two shift per day, five day a week basis. Coating material usage is 500 ml/min. A solvent/voltage blocking medium circulation system of the type illustrated in FIG. 16 holds about 4.7 gal. (about 17.8 liters) of one part n-butanol and four parts SC100 and about four pounds (about 1.8 kg) of 4A molecular sieves 1658 of the type previously described. At 500 ml/min. of coating material, the valve 1588 will operate 960 times during the two-shift day or approximately 5000 cycles per five-day week of two-shift days. The solvent/blocking medium and molecular sieves will only need to be replaced once a week at a cost of about thirty dollars.

Figure 17:
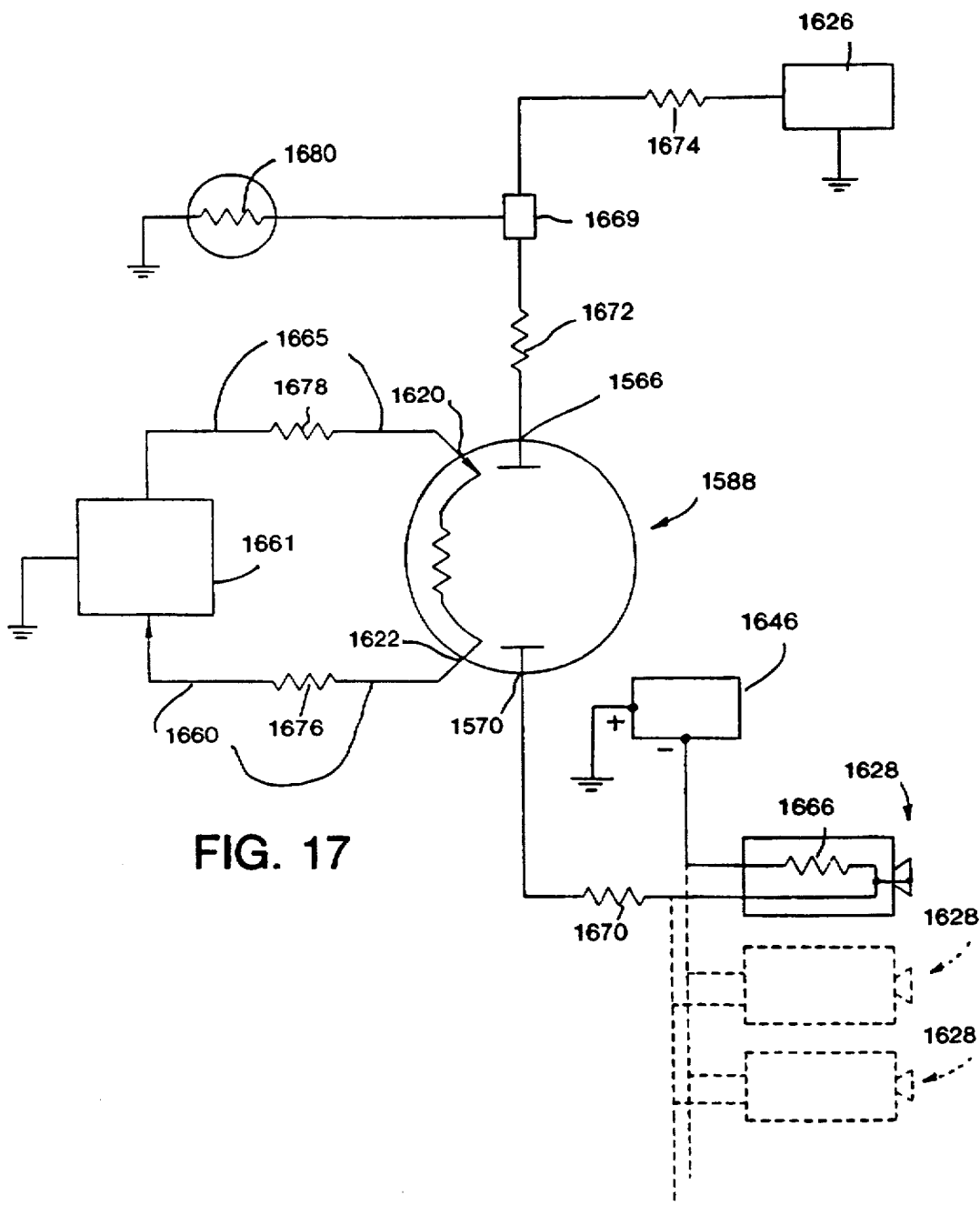
FIG. 17 illustrates a partly block and partly schematic diagram of an electrical circuit useful for analyzing the system of FIGS. 14–16.

Turning now to FIG. 17, an electrical analysis of a system constructed generally as described in connection with FIGS. 14–16 is provided. Each of one or more coating material dispensers 1628 coupled to high magnitude potential supply 1646 consumes current as it dispenses the coating material. The current flows partly as corona discharge and partly as charge on the particles of coating material dispensed toward the typically grounded articles (not shown) to be coated by the coating material. A resistance 1666 is associated with each dispenser. Each resistance 1666 is on the order of 750 MΩ. Additionally, some current flows "backward" through the coating material supply circuit of FIG. 17, carried by the conductive coating material back toward the grounded coating material supply 1626 through the effective resistance 1670 of the coating material column between the dispenser 1628 and the valve 1588, the effective resistance 1672, 1674 of the coating material column between the valve 1588 and the grounded supply 1626 and three shunt paths. One of these shunt paths includes the effective resistance 1676 between the valve 1588 and the grounded solvent/voltage blocking medium source 1661 through the return line 1660. One includes the effective resistance 1678 between the valve 1588 and the grounded solvent/voltage blocking medium source 1661 through the supply line 1665.

The third shunt path extends from a conductive fitting 1669 in the coating material supply line, between resistances 1672 and 1674, to ground through the resistance 1680 of a meter which monitors the voltage blocking capability of the solvent/voltage blocking medium. The meter can be any of a number of known types such as, for example, the Ransburg® model 70408-00 test assembly. A typical resistance for such an assembly, and therefore for resistor 1680, would be 1800 Ω. Resistors 1676, 1678 illustratively are virtually identical, there being only slight differences at any time between the resistivities of the supply and return columns of solvent/voltage blocking medium from/to the reservoir 1661. The effective resistance of the circuit illustrated in solid lines in FIG. 17 including resistances 1666, 1670, 1672, 1674, 1676, 1678 and 1680 is about one-third the resistance of the air gap between the dispenser 1628 and the article to be coated, so that about three times as much current flows through resistance 1670 as across the dispenser-article space under proper operating conditions. And, because of the relatively much lower resistance 1680 of the meter than of any of the other resistances, almost all of that current flows through the meter resistance 1680. Thus, this assembly provides a suitable technique for continuously monitoring the condition (conductivity/resistivity) of the solvent/ voltage blocking medium. Go-no go limits can be established for requiring the solvent/voltage blocking medium (and molecular sieves 1658) to be renewed.

Figure 18:
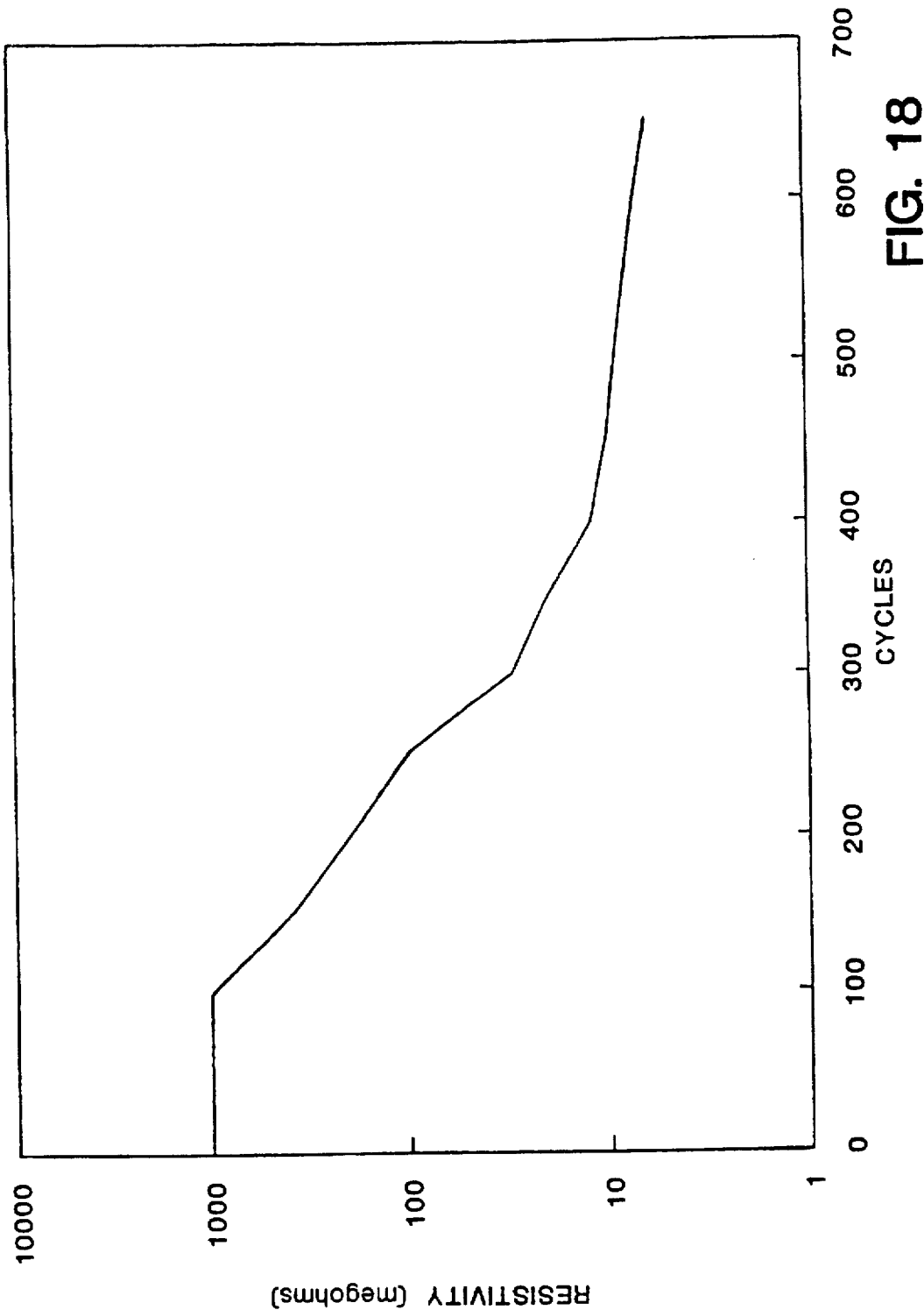
FIG. 18 illustrates graphs of solvent/voltage blocking medium resistivity versus number of operating cycles for the valve illustrated in FIGS. 14–17.

FIGS. 18–22 graphically illustrate system results with and without molecular sieves 1658 and with different solvent/ voltage blocking medium formulations. FIG. 18 illustrates solvent/blocking medium resistivity (in MΩ)versus number of valve 1588 cycles for a solvent/blocking medium volume of 10 liters (2 liters n-butanol and 8 liters SC100) with no molecular sieves 1658. At the end of about 650 valve 1588 cycles, the solids content of the solvent/voltage blocking medium was less than about one-half of one percent, but its resistivity had declined by more than two orders of magnitude.

Figure 19:
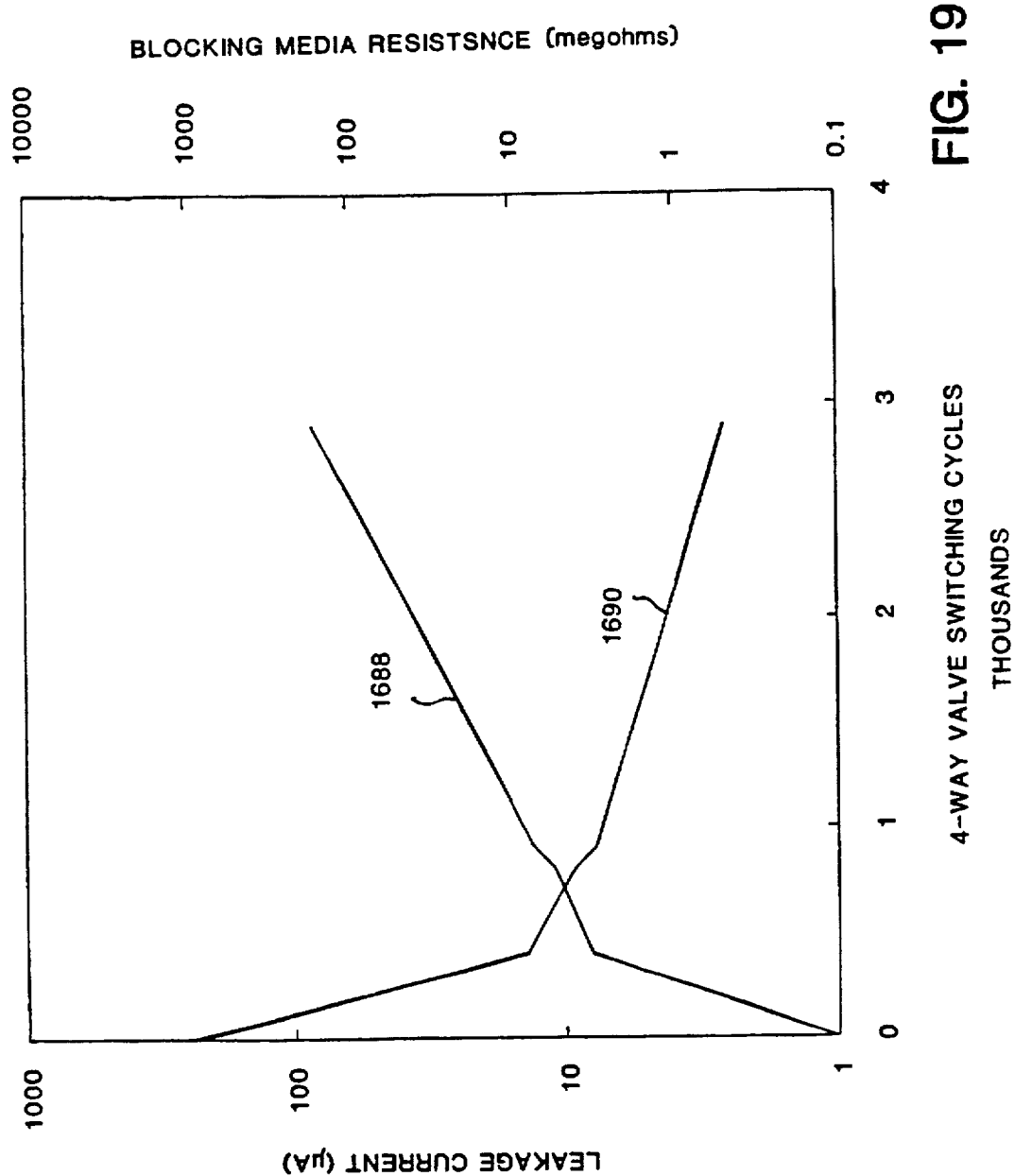
FIG. 19 illustrates graphs of leakage current versus operating cycles, and solvent/voltage blocking medium resistance versus operating cycles for the valve of FIGS. 14–17 with a particular solvent/voltage blocking medium composition.

FIG. 19 illustrates leakage current (in µA on a logarithmic scale) on the left-hand ordinate versus valve 1588 cycles (in thousands), and solvent/voltage blocking medium resistance (in MΩ on a logarithmic scale) on the right-hand ordinate versus valve 1588 cycles (in thousands). The solvent/ blocking medium in this test comprises about 2 liters isopropanol and about 8 liters SC100. 5A molecular sieves 1658 are used. As will be appreciated by comparison with FIG. 18, an approximately one order of magnitude improvement (increase) in resistance of the solvent/blocking medium over the approximately 650 valve 1588 cycles documented in FIG. 18 is achieved. This is believed to be attributable primarily to the presence of the molecular sieves 1658.

Figure 20:
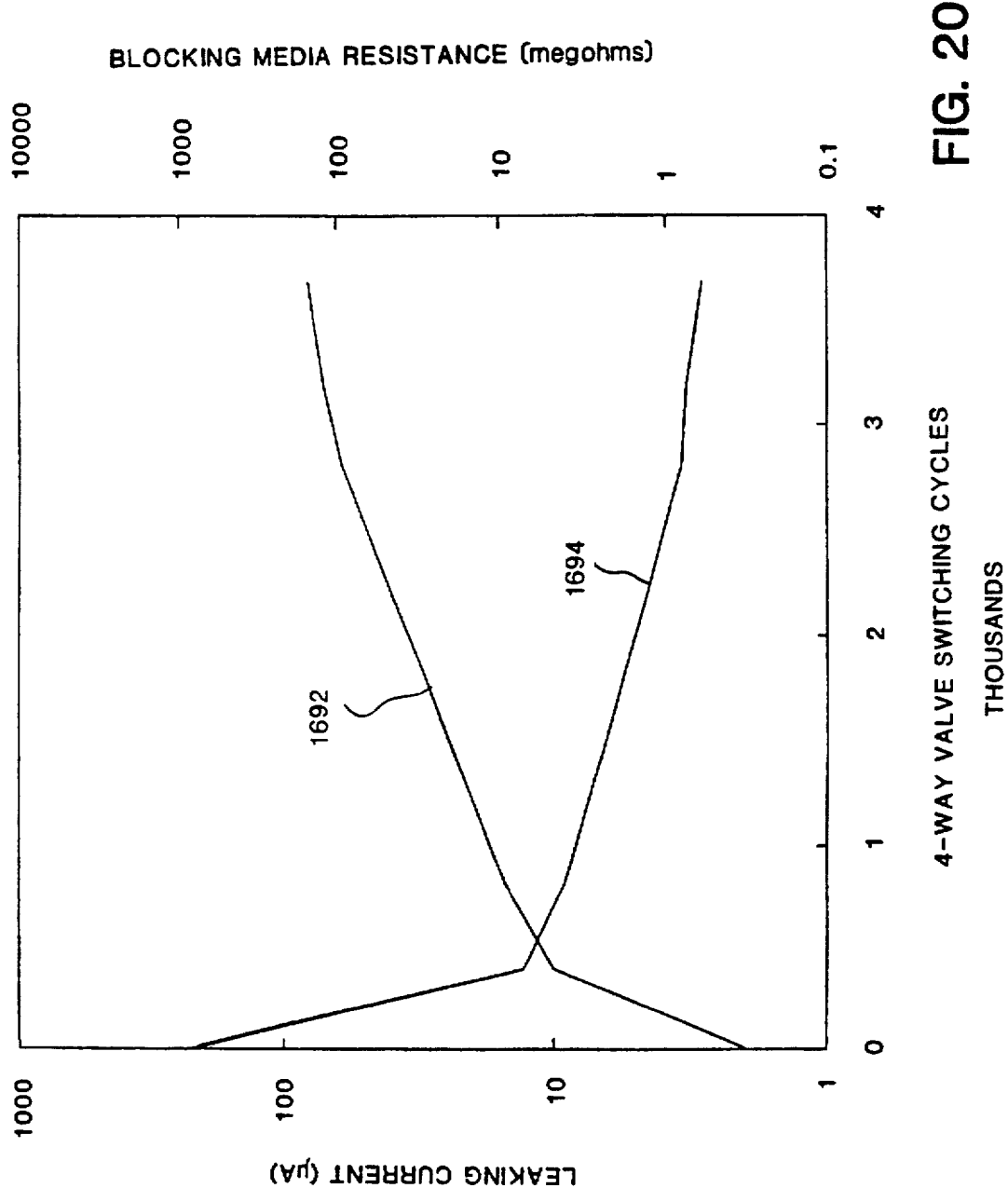
FIG. 20 illustrates graphs of leakage current versus operating cycles, and solvent/voltage blocking medium resistance versus operating cycles for the valve of FIGS. 14–17 with a particular solvent/voltage blocking medium composition.

FIG. 20 illustrates leakage current (in µA on a logarithmic scale) on the left-hand ordinate versus valve 1588 cycles (in thousands), and solvent/voltage blocking medium resistance (in MΩ on a logarithmic scale) on the right-hand ordinate versus valve 1588 cycles (in thousands). The solvent/voltage blocking medium in this test again comprises about 2 liters isopropanol and about 8 liters SC100. 4A molecular sieves 1658 are used. Again, an approximately one order of magnitude improvement in resistance of the solvent/voltage blocking medium over the first 650 cycles of value 1588 operation is apparent by comparison with the results documented in FIG. 18.

Figure 21:
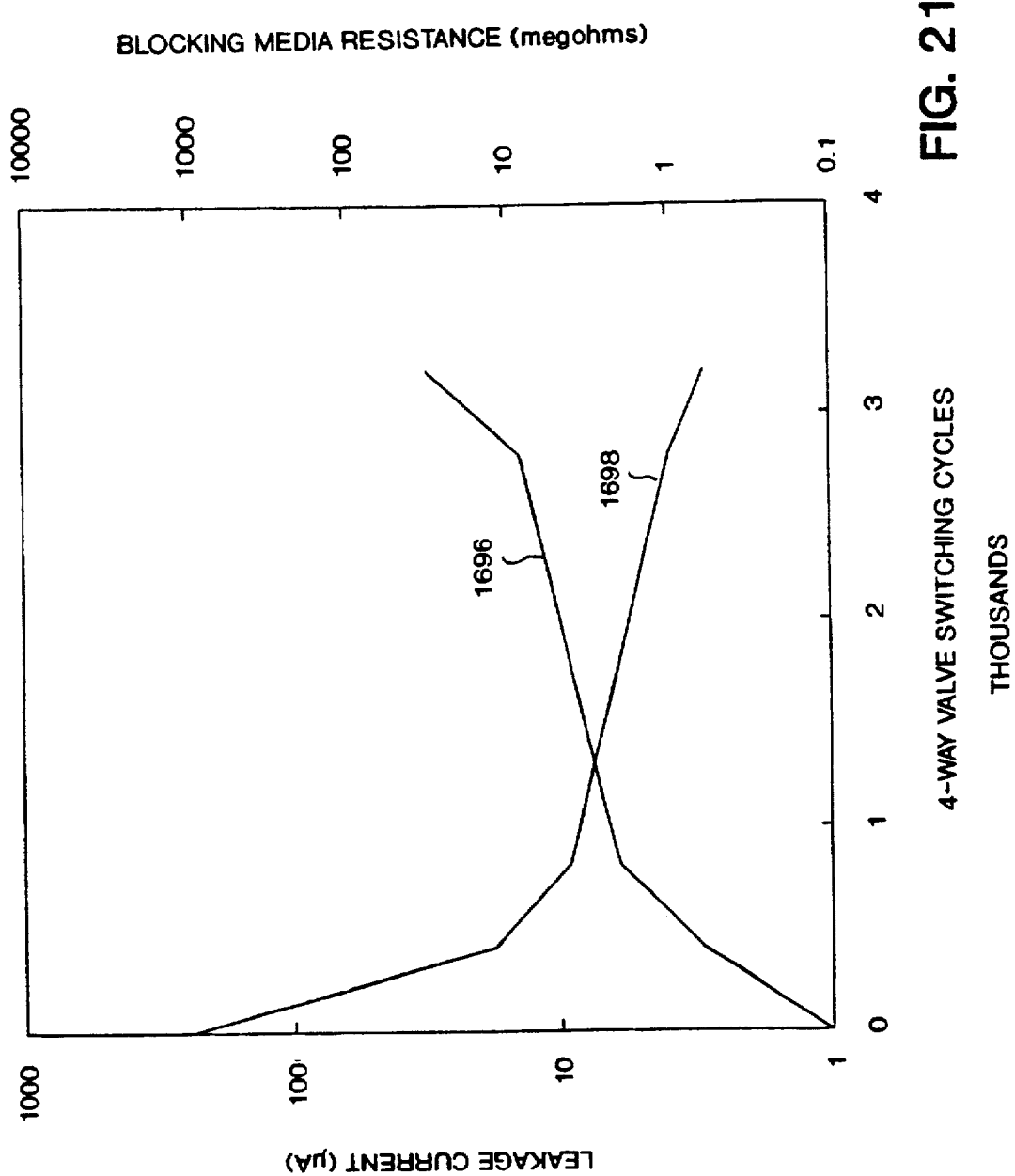
FIG. 21 illustrates graphs of leakage current versus operating cycles, and solvent/voltage blocking medium resistance versus operating cycles for the valve of FIGS. 14–17 with a particular solvent/voltage blocking medium composition.

FIG. 21 illustrates leakage current (in µA on a logarithmic scale) on the left-hand ordinate versus valve 1588 cycles (in thousands), and solvent/voltage blocking medium resistance (in MΩ on a logarithmic scale) on the right-hand ordinate versus valve 1588 cycles (in thousands). The solvent/voltage blocking medium in this test comprises about 2 liters n-butanol and about 8 liters SC100. 4A molecular sieves 1658 are used. Again an approximately one order of magnitude improvement in resistivity of the solvent/voltage blocking medium over the first 650 cycles is apparent by comparison with FIG. 18.

Figure 22:
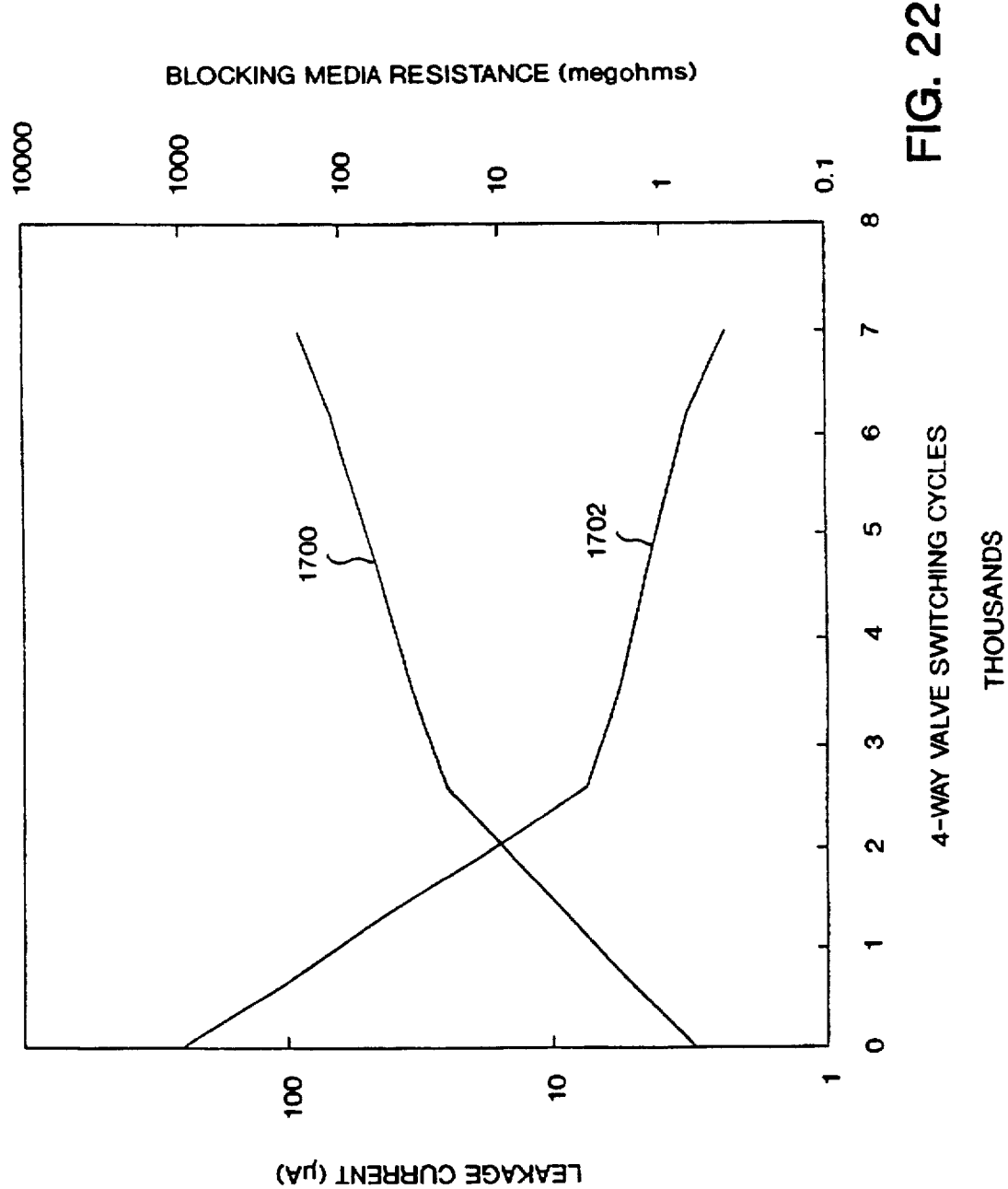
FIGS. 22 illustrates graphs of leakage current versus operating cycles, and solvent/voltage blocking medium resistance versus operating cycles for the valve of FIGS. 14–17 with a particular solvent/voltage blocking medium composition.

Finally, FIG. 22 illustrates leakage current (in μA on a logarithmic scale) on the left-hand ordinate versus valve 1588 cycles (in thousands) and solvent/voltage blocking medium resistance (in Mn on a logarithmic scale) on the right-hand ordinate versus valve 1588 cycles (in thousands). In this test, the solvent/voltage blocking medium comprises about 3.6 liters of n-butanol and about 14.4 liters of SC100. 4A molecular sieves 1658 are again used. An almost two orders of magnitude improvement in resistivity of the solvent/voltage blocking medium over 650 cycles is apparent by comparison with FIG. 18.

Figure 23:
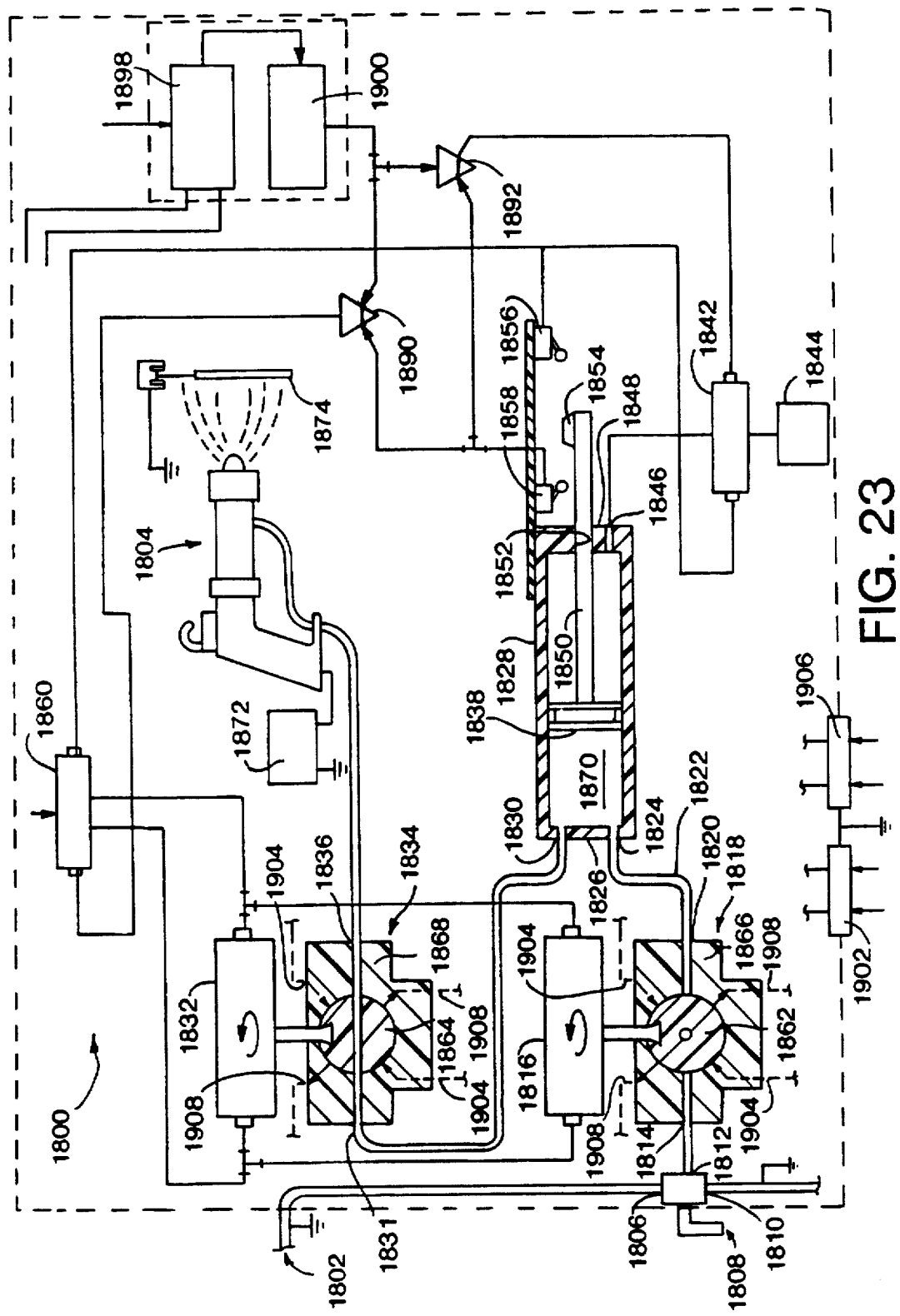
FIG. 23 illustrates highly diagrammatically another system constructed according to the present invention; and, FIG. 24 illustrates highly diagrammatically another system constructed according to the present invention.

Another embodiment of the invention is illustrated in FIG. 23. A system 1800 supplies an electrically non-insulative coating material from an electrically grounded reservoir 1802 to a dispenser 1804 of any of the types previously discussed at high voltage. Coating material is supplied to a first input port 1806 of a first, manual three-way valve 1808. Another input port 1810 of valve 1808 is coupled to a grounded supply of solvent which functions as a solvent for flushing the system 1800, for example, during color change. An output port 1812 of three-way valve 1808 is coupled to an input port 1814 of an actuator 1816-powered two-way valve 1818. The illustrated valve 1818 is a ball valve, but any suitable type of two-way valve can be used. An output port 1820 of valve 1818 is coupled through a fluid line 1822 to an input port 1824 in a head 1826 of a fluid reservoir cylinder 1828. An output port 1830 in head 1826 is coupled to an input port 1831 of an actuator 1832-powered two-way valve 1834. Valve 1834 illustratively is identical in construction to valve 1818. An output port 1836 of valve 1834 is coupled to an input port of dispenser 1804.

A piston 1838 is reciprocated in cylinder 1828 away from head 1826 by fluid flowing into cylinder 1828 through port 1840. Piston 1838 is reciprocated toward head 1826 by compressed air supplied through a three-way air valve 1842 from a compressed air source 1844 to an air inlet/outlet port 1846 in a head 1848 of cylinder 1828. Piston 1838 is provided with a piston rod 1850 which reciprocates in an opening 1852 formed in head 1848. An actuator 1854 on the end of rod 1850 outside cylinder 1828 cooperates with position sensors on two pneumatic switches 1856, 1858 to define the limits of piston 1838 travel. At maximum coating material volume under head 1826, switch 1856 switches air valve 1842 on, supplying compressed air through port 1846 in head 1848 to force coating material from port 1830. A four-way air valve 1860, which also receives a piston 1838 travel limit signal from switch 1856, signals actuators 1816, 1832 which rotates the moving components 1862, 1864 of valves 1818, 1834 synchronously 90° relative to their respective housings 1866, 1868. This isolates the reservoir 1870 between piston 1838 and head 1826 from the grounded coating material supply 1802 and couples the reservoir 1870 to the dispenser 1804 which is maintained at high-magnitude electrostatic potential. Coating material is supplied from reservoir 1870 through valve 1834 to dispenser 1804 for electrostatic charging by a supply 1872 and atomization to coat an article 1874.

As piston 1838 approaches the head 1826 limit of its travel, pneumatic switch 1858 closes, signalling four-way air valve 1860 and three-way air valve 1842 through respective control valves 1890, 1892. The signal to four-way air valve 1860 causes actuator 1816 to rotate the moving components 1862, 1864 of valves 1818, 1834, respectively, both 900 in the other direction with respect to their respective housings 1866, 1868, cutting off the supply of coating material through valve 1834 to dispenser 1804 and conditioning valve 1818 to supply more coating material from reservoir 1802 through valve 1818 to reservoir 1870. This process is repeated as often as required to complete coating of one or more articles 1874 to be coated by dispenser 1804.

Sometimes it is necessary or convenient to be able to place the system illustrated in FIG. 23 in one or the other of its states. This might be the case, for example, when the system is to be flushed prior to changing the color of the material being dispensed. In such circumstances, a "trigger on" or "reset" signal or a "trigger off" or "start" signal can be sent through a pneumatic timer 1898, a pneumatic pulse shaper 1900 and control valves 1890, 1892. These signals place valves 1842 and 1860 in the same conditions as do the signals generated by pneumatic limit switches 1856, 1858. They permit the reservoir 1870 to be partially filled with solvent for the coating material and then emptied through the dispenser 1804 to flush remaining coating material from the system 1800 circuit. The system 1800 is then ready to receive the next color of coating material. A quick disconnect can be provided at port 1806 for convenience in color change. The system 1800 further includes an inlet manifold 1902, inlets 1904 on valve housings 1866, 1868, an outlet manifold 1906 and outlets 1908 on valve housing 1866, 1868. These circulate in valve housings 1866, 1868 an electrically non-conductive solvent. Circulation of the electrically non-conductive solvent helps isolate the high-magnitude voltage port 1836 of valve 1834 from the low-magnitude voltage port 1814 of valve 1818, and washes away coating material residue on the internal surfaces of valves 1818, 1834 including the adjacent surfaces of housings 1866, 1868 and their respective movable components 1862, 1864.

In the embodiment of the invention illustrated in FIG. 24, four two-way valves 1910, 1912, 1914, 1916 and a double acting cylinder reservoir 1918 are employed. Coating material, illustratively from a selected one of three grounded supplies through a selected one of manifold valves 1920, 1922, 1924 is provided through fluid conduits 1926, 1928 to inlet ports 1930, 1932, respectively, of valves 1910, 1912, respectively. The outlet ports 1934, 1936 of valves 1910, 1912, respectively, are coupled to inlet ports 1938, 1940, in heads 1942, 1944, respectively at the ends of cylinder reservoir 1918. The outlet ports 1945, 1947 in heads 1942, 1944, respectively, are coupled to the inlet ports 1949, 1951, of valves 1914, 1916, respectively. The outlet ports 1953, 1955 of valves 1914, 1916, respectively, are coupled through conduits 1957, 1959 to a trigger (1961)/dump (1963) valve manifold.

The output port of trigger valve 1961 provides coating material to a coating dispenser 1965 which is ordinarily maintained at high magnitude electrostatic potential by a high magnitude electrostatic potential supply 1967 and the electrically non-conductive, for example, resin or filled resin, components from which the coating material circuit is largely constructed. The output port of dump valve 1963 is coupled by an electrically non-conductive conduit 1969 to a dump tank 1971.

Pistons 1946, 1948, joined by a connecting rod 1950, close the reservoirs under heads 1942, 1944, respectively. Low superatmospheric pressure compressed air pilot signals are provided to input ports 1952, 1954 of cylinder 1918 so that the travel limits of pistons 1946, 1948 can be sensed. The pneumatic sensing circuit for the travel limits of pistons 1946, 1948 in the cylinder reservoir 1918 comprises the double-piloted, four-way pneumatic valve 1956 which controls the operation of the pneumatic actuators 1958, 1960, 1962, 1964 controlling the operation of the valves 1910, 1912, 1914, 1916, respectively. The pilots 1966, 1968 of the four-way pneumatic valve 1956 operate on a pressure balance principle. A low volume of air continuously bleeds from each pilot port 1966, 1968. Pneumatic tubing couples each of the pilot ports 1966, 1968, to a respective port 1952, 1954 in the center section 1974 of the cylinder 1918. The air escapes from the cylinder 1918 through exhaust ports 1976, 1978 also provided in the cylinder 1918 center section 1974. As one or the other of the pistons 1946, 1948 bottoms out against its respective distal end 1980, 1982 of port 1952, 1954 at an end of its stroke, its respective port 1952, 1954 is momentarily obstructed, causing pressure to increase at the respective port 1966, 1968 of piloted four-way pneumatic valve 1956. This, in turn, causes actuators 1958, 1960, 1962, 1964 to be actuated, causing the valves 1910, 1912, 1914 and 1916 to shift and returning pistons 1946, 1948 in the opposite direction.

With the system components in the orientations illustrated in FIG. 24, coating material under pressure is flowing through valve 1910 into the reservoir under head 1942, and from the reservoir under head 1944 through valve 1916 to dispenser 1965. Electrical isolation of the high magnitude potential supply 1967 from the grounded coating material supplies 1920, 1922, 1924 is achieved by the electrically non-conductive, for example, resin, constructions of valves 1912 and 1914 and related components. As piston 1946 approaches port 1980, a pressure increase is sensed by valve 1956 via ports 1952 and 1966. Valve 1956 switches actuators 1958, 1960, 1962 and 1964, rotating the movable components of valves 1910, 1912, 1914, 1916 to their not illustrated positions. In these positions, coating material under pressure flows through valve 1912 into the reservoir under head 1944, and from the reservoir under head 1942 through valve 1914 to dispenser 1965. Electrical isolation of the high magnitude potential supply 1967 from the grounded coating material supplies 1920, 1922, 1924 now is achieved by the electrically non-conductive, for example, resin, constructions of valves 1910 and 1916 and related components.

This process is repeated until it is desired to flush the selected color from the system, for example, to effect a color change. At that time, the selected color valve 1920, 1922, 1924 is closed and a solvent valve 1990 is opened, providing a supply of solvent, for example, water, to the system so that the pre-flush color can be purged from it. The system is driven through some number of the above-described cycles to purge it, then filled with the next selected color by closing valve 1990, blowing the system dry with compressed air supplied through a valve 1992, and then opening a selected color valve 1920, 1922, 1924 and charging the system with that selected color.

Trigger valve 1961 and dump valve 1963 cooperate to steer whatever fluid the system is charged with either to the dispenser 1965, which is normally maintained at high magnitude electrostatic potential, or to the typically grounded dump tank 1971 for recovery. Since the dump tank 1971 ordinarily is grounded, and since electrically conductive coating material residue, may remain in the conduit 1969 extending to the dump tank 1971 at the end of a flushing cycle, it may be necessary to pass drying air through the conduit 1969 as well to maintain the insulated integrity of the system. Alternatively, the conduit 1969 can be isolated from ground, for example, by a twelve inch (approximately 31 cm) air gap. An inlet manifold 2000, inlets 2002, outlets 2004 and an outlet manifold 2006 circulate an electrically non-conductive solvent in valves 1910, 1912, 1914 and 1916 as a means to isolate the high-magnitude voltage and low-magnitude ports of valves 1910, 1912, 1914 and 1916 and to wash away coating material film from surfaces of valves 1910, 1912, 1914 and 1916. A suitable process controller 2008, such as a programmable logic controller (PLC) or the like, is provided to control the coating and flushing processes conducted by the FIG. 24 system.

What is claimed is:

1. A valve having a housing and a component movable within the housing, the housing having first, second, third, fourth, and fifth ports formed in it, the movable component having a first passageway formed in it, a first orientation of the movable component within the housing selectively connecting the first port through the first passageway to the second port, a second orientation of the movable component within the housing selectively connecting the second port through the first passageway to the third port, and a second passageway defined between the housing and the movable component, the fourth port and fifth port connected to the second passageway at both the first and second orientations of the movable component, the fourth port comprising a first slot shaped opening facing the movable component.

2. The apparatus of claim 1 wherein the movable component has a circular cross section and an axis of rotation passing through the center of the circular cross section.

3. The apparatus of claim 2 wherein the movable component comprises a generally spherically shaped surface.

4. The invention of claim 1, 2 or 3 wherein the movable component and valve housing comprise electrically non-conductive materials.

5. The invention of claim 4 wherein the electrically non-conductive materials comprise resins.

6. The invention of claim 5 wherein the electrically non-conductive materials comprise filled resins.

7. The apparatus of claim 6 wherein the housing further comprises a sixth port, and the movable component further comprises a third passageway, the first orientation of the movable component within the housing selectively connecting the first port and the second port through the first passageway and the third port and the sixth port through the third passageway, and the second orientation of the movable component within the housing selectively connecting the first port and the sixth port through the third passageway and the second port and the third port through the first passageway.

8. The apparatus of claim 1, 2 or 3 wherein the housing further comprises a sixth port, and the movable component further comprises a third passageway, the first orientation of the movable component within the housing selectively connecting the first port and the second port through the first passageway and the third port and the sixth port through the third passageway, and the second orientation of the movable component within the housing selectively connecting the first port and the sixth port through the third passageway and the second port and the third port through the first passageway.

9. The invention of claim 8 wherein the movable component and valve housing comprise electrically non-conductive materials.

10. The invention of claim 9 wherein the electrically non-conductive materials comprise resins.

11. The invention of claim 10 wherein the electrically non-conductive materials comprise filled resins.

12. The apparatus of claim 1 wherein the fifth port comprises a second slot shaped opening facing the movable component.

13. A valve having a first movable valve component and a first valve housing, a first passageway defined through the first movable component, first, second, third and fourth ports through the first valve housing, the first movable component having a first orientation in which the first passageway couples the first port to the second port and a second orientation in which the first passageway does not couple the first port to the second port, and a second passageway defined between the first movable component and the first valve housing, the second passageway coupling the third port to the fourth port at both the first and second orientations, the third port comprising a first slot shaped opening facing the movable component.

14. The apparatus of claim 13 wherein the movable component has a circular cross section and an axis of rotation passing through the center of the circular cross section.

15. The apparatus of claim 14 wherein the movable component comprises a generally spherically shaped surface.

16. The apparatus of claim 13, 14 or 15 wherein the first movable component and first valve housing comprise electrically non-conductive materials.

17. The apparatus of claim 16 wherein the electrically non-conductive materials comprise resins.

18. The apparatus of claim 17 wherein the electrically non-conductive materials comprise filled resins.

19. The apparatus of claim 13 wherein the fourth port comprises a second slot shaped opening facing the movable component.

20. The invention of claim 12 or 19 wherein the movable component and valve housing comprise electrically non-conductive materials.

21. The invention of claim 20 wherein the electrically non-conductive materials comprise resins.

22. The invention of claim 21 wherein the electrically non-conductive materials comprise filled resins.

* * * * *